US011954352B2

(12) United States Patent
Shveidel et al.

(10) Patent No.: US 11,954,352 B2
(45) Date of Patent: Apr. 9, 2024

(54) TECHNIQUES FOR LOCK CONTENTION REDUCTION IN A LOG STRUCTURED SYSTEM

(71) Applicant: Dell Products L.P., Hopkinton, MA (US)

(72) Inventors: Vladimir Shveidel, Pardes-Hana (IL); Uri Shabi, Tel Mond (IL)

(73) Assignee: Dell Products L.P., Hopkinton, MA (US)

( * ) Notice: Subject to any disclaimer, the term of this patent is extended or adjusted under 35 U.S.C. 154(b) by 77 days.

(21) Appl. No.: 17/852,999

(22) Filed: Jun. 29, 2022

(65) Prior Publication Data
US 2024/0004569 A1    Jan. 4, 2024

(51) Int. Cl.
G06F 3/06    (2006.01)

(52) U.S. Cl.
CPC .......... *G06F 3/0641* (2013.01); *G06F 3/0604* (2013.01); *G06F 3/0643* (2013.01); *G06F 3/0659* (2013.01); *G06F 3/067* (2013.01)

(58) Field of Classification Search
CPC .... G06F 3/0641; G06F 3/0604; G06F 3/0643; G06F 3/0659; G06F 3/067
USPC ........................................................ 711/154
See application file for complete search history.

(56) References Cited

U.S. PATENT DOCUMENTS

| 2002/0078119 | A1* | 6/2002 | Brenner | G06F 9/526 718/102 |
| 2007/0094669 | A1* | 4/2007 | Rector | G06F 9/526 718/104 |
| 2010/0082547 | A1* | 4/2010 | Mace | G06F 16/1748 707/648 |
| 2010/0332770 | A1* | 12/2010 | Dice | G06F 9/526 711/E12.066 |
| 2022/0114100 | A1* | 4/2022 | David | G06F 12/0815 |

OTHER PUBLICATIONS

U.S. Appl. No. 17/511,107, filed Oct. 26, 2021, entitled Method and System for Improving Performance During Deduplication, to Michael Litvak, et al.
U.S. Appl. No. 16/260,660, filed Jan. 29, 2019, entitled System and Method for Aggregating Metadata Changes in a Storage System, to Vladimir Shveidel, et al.

* cited by examiner

Primary Examiner — Prasith Thammavong
Assistant Examiner — Sidney Li
(74) Attorney, Agent, or Firm — Muirhead and Saturnelli, LLC

(57) ABSTRACT

A request to perform a first operation in a system that stores deduplicated data can be received. The system can include a data block stored at multiple logical address each referencing the data block. A reference count can be associated with the data block and can denote a number of logical addresses referencing the data block. Processing can be performed to service the request and perform the first operation, wherein the processing can include: acquiring a non-exclusive lock for a page that includes the reference count of the data block; storing, in a metadata log while holding the non-exclusive lock on the page, an entry to decrement the reference count of the data block; and releasing the non-exclusive lock on the page.

20 Claims, 15 Drawing Sheets

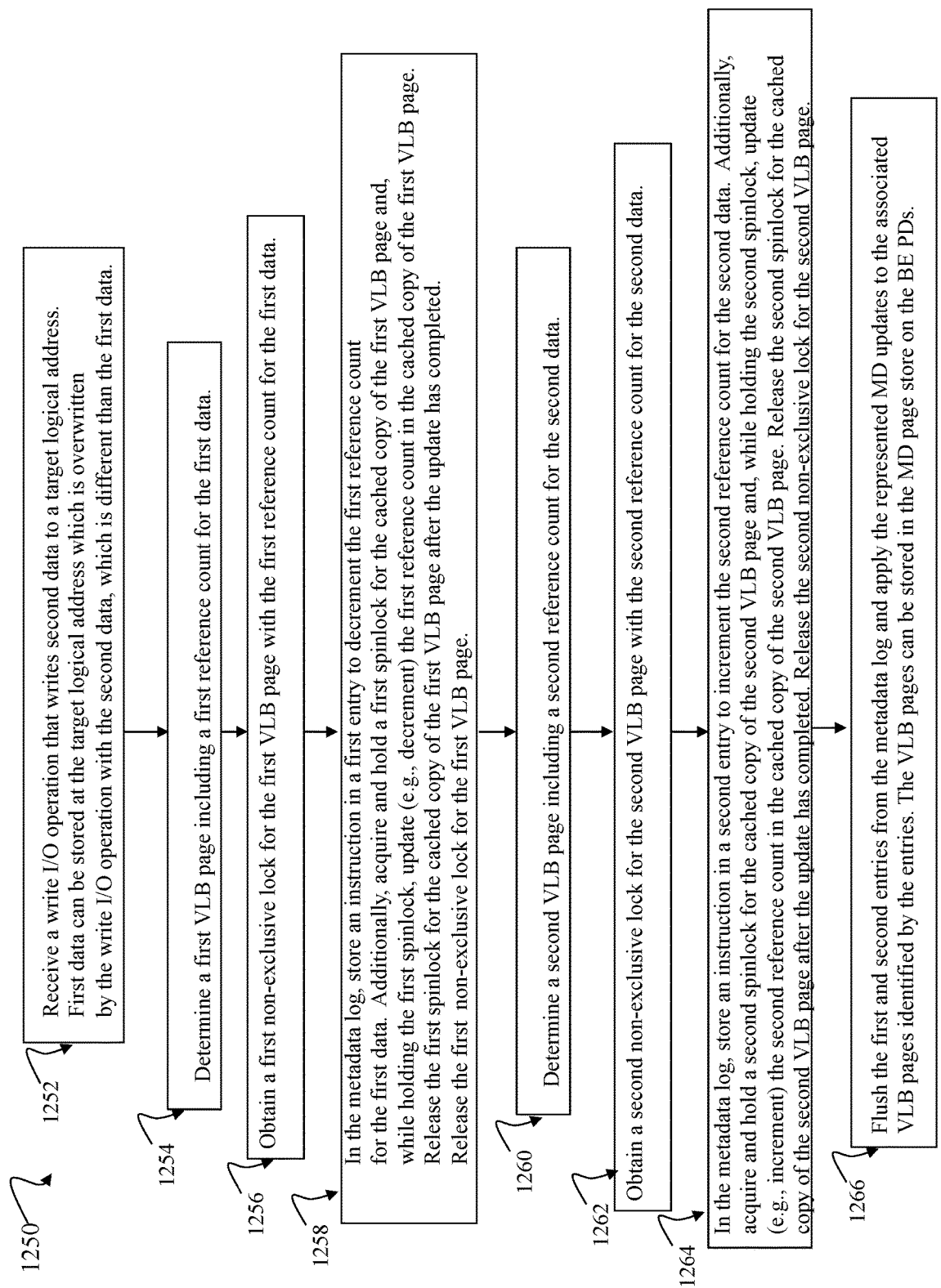

TECHNIQUES FOR LOCK CONTENTION REDUCTION IN A LOG STRUCTURED SYSTEM

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. In at least one embodiment, a request is received to perform a first operation in a system that stores deduplicated data, wherein the system includes a first data block stored at a plurality of logical address each referencing the first data block, wherein a reference count is associated with the first data block and denotes a number of logical addresses referencing the first data block. First processing is performed to service the request and perform the first operation. The first processing includes: acquiring a non-exclusive lock for a page that includes the reference count of the first data block; storing, in a metadata log while holding the non-exclusive lock on the page, an entry to decrement the reference count of the first data block; and releasing the non-exclusive lock on the page.

In at least one embodiment, the first operation can include deleting content stored at a first logical address, and wherein the first data block can be stored at the first logical address and a second of the plurality of logical addresses. The first operation can be a command to delete a storage object including the first logical address. The storage object can be any of a logical device, a file, a file system, and a directory.

In at least one embodiment, the first operation can be a write operation that writes second data to a first of the plurality of logical addresses, wherein the first logical address can reference the first data block prior to the write operation and can indicate that, prior to the write operation, first data stored in the first data block is stored at the first logical address. The write operation can overwrite the first logical address with second data stored in a second data block, and wherein a second page can include a second reference count denoting a number of logical addresses that reference the second data block storing the second data.

In at least one embodiment, the first processing can include: determining that the second data stored at the first logical address by the write operation is a duplicate of an existing copy of the second data stored at the second data block, wherein a second of the plurality of logical addresses references the second data block prior to performing the first processing to service the write operation; acquiring a second non-exclusive lock for the second page that includes the second reference count of the second data block; storing, in the metadata log while holding the second non-exclusive lock on the second page, an entry to increment the second reference count of the second data block; and releasing the second non-exclusive lock on the second page. The first processing can include: acquiring a spinlock for a cached copy of the page stored in a cache; while holding the spinlock and the non-exclusive lock on the page, updating a copy of the reference count included in the cached copy of the page, wherein said updating includes decrementing the copy of the reference count in the cached copy of the page; and releasing the spinlock.

In at least one embodiment, the system can includes a plurality of nodes, the cache can be a local cache of a first node of the plurality of nodes, and wherein the cache can be accessible and used by only the first node and not by any other node of the plurality of nodes. The non-exclusive lock of the page can be a global lock having associated state that is synchronized across the plurality of nodes using internode communication, wherein access allowable using the non-exclusive lock on the page includes reading and writing of the page as persistently stored on backend storage of the system and also includes reading and writing of a cached copy of the page. A first thread of the first node and a second thread of the first node can concurrently hold the non-exclusive lock on the page, and wherein the first thread and the second thread can concurrently update the page by recording entries in the metadata journal to update the page. The first processing can be performed by an executing code entity that executes on the first node, wherein the spinlock can be a node-local lock of the first node and can provide exclusive access of the cached copy of the page to the executing code entity of the first node when the spinlock is held by the executing code entity.

In at least one embodiment, processing can include: receiving, from a storage client, a read operation that reads first data from a first logical address of the plurality of logical address, wherein the first logical address references the first data block storing the first data, wherein mapping information maps the first logical address to the first data block, wherein the mapping information includes the page comprising the reference count and a field that references the first data block; retrieving, using the mapping information, current content stored at the first logical address, wherein the current content includes the first data from the first data block, and wherein said retrieving uses the mapping information to read the first data from the first data block, wherein the reference count of the page is less than one when said retrieving is performed; and responsive to the read operation, returning the first data to the storage client. Processing can further include: reading the reference count of the page while holding the non-exclusive lock of the page; responsive to said reading, determining that the reference count is less than one; and responsive to determining the reference count is less than one, performing second processing including: acquiring and holding an exclusive lock on the page; rereading the reference count of the page while holding the exclusive lock of the page; responsive to said rereading, determining whether the reference count of the page is greater than zero; responsive to determining the reference count is greater than zero, determining that the reference count is valid; and responsive to determining that the reference count is not greater than zero, determining that the reference count is invalid and denotes an error condition.

In at least one embodiment, the exclusive lock of the page can be a global lock having associated state that is synchronized across a plurality of nodes using internode communication. An executing code entity of a first of the plurality of node can hold the exclusive lock on the page and can be thus granted exclusive access to the page as stored persistently on backend storage of the system, and can also be granted exclusive access to the page as cached on the first node.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 8, 9 and 10 are flowcharts of processing steps that can be performed in at least one embodiment in accordance with the techniques of the present disclosure.

DETAILED DESCRIPTION OF EMBODIMENT(S)

Figure 1:
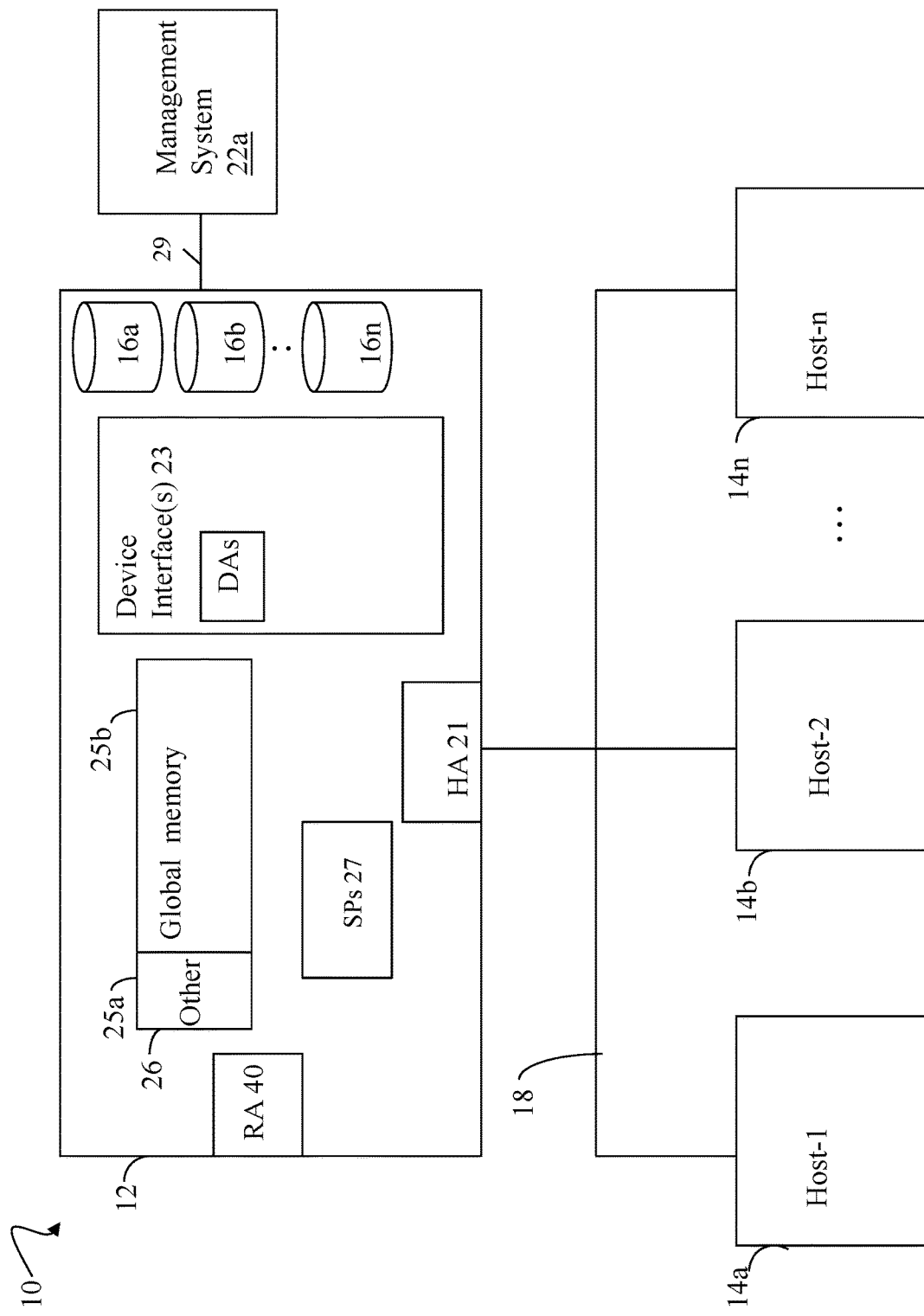
FIG. 1 is an example of components that may be included in a system in accordance with the techniques of the present disclosure.

A data storage system can perform different data services. For example, some data storage systems can perform data deduplication to reduce the non-volatile backend physical storage consumed for storing user data or content. Data deduplication (sometimes referred to simply as deduplication) provides for removing redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a metadata (MD) page, where the MD page can include a reference count denoting the number of references to the data block. The reference count (sometimes referred to as a reference counter) can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count associated with the data block can be decremented as existing content of a particular logical address is modified or deleted to no longer be considered a duplicate of the single existing copy of the data block.

In some existing conventional systems, a shared or non-exclusive lock on the MD page can be held by multiple threads allowed to concurrently access the MD page for reading. In some existing conventional systems, updating MD such as the reference count of a MD page can be performed by obtaining an exclusive lock or a write lock for the MD page, thereby providing exclusive access to the MD page including the reference count, and then, while holding the exclusive lock, updating the reference count atomically such as using an atomic read-modify-write operation in order to guarantee data consistency. In some applications, the same data or content can be written by multiple writes to many different logical addresses within a relatively short time period thereby requiring multiple associated updates to the reference count corresponding to the single copy of the deduplicated data or content written multiple times. Although deduplication processing can optimize and reduce non-volatile physical storage used to store the duplicate content that is written by the multiple writes, there can also be additional contention when processing the multiple writes. In particular, there can be additional contention to obtain exclusive access by acquiring the exclusive lock to the same MD page including the reference count that is updated with each additional reference to the same single copy of the written data. The foregoing can cause multiple deduplication transactions processing the multiple writes to queue and block waiting to acquire the same exclusive lock providing exclusive access to the same MD page with the reference count. As a result, the performance of the system can be adversely impacted. Additionally, the adverse impact can be greater, for example, if data deduplication is performed across multiple nodes of the same system where the lock access to the same MD page with the reference count is synchronized across the multiple nodes.

Accordingly, described in the following paragraphs are techniques of the present disclosure that can be performed to reduce lock contention of the MD page including the reference count. The techniques of the present disclosure provide for obtaining a non-exclusive lock for the MD page with the reference count to be updated rather obtaining an exclusive lock for the MD page. With a non-exclusive lock for the MD page, multiple concurrent transactions, either on the same node or across nodes of the system, can all concurrently acquire and hold the non-exclusive lock on the MD page. In at least one embodiment, multiple threads concurrently holding the non-exclusive lock on the MD page can include multiple writers that can modify the same reference count of the MD page. Because the lock is non-exclusive, a first writer holding the non-exclusive lock on the MD page can modify the reference count while a second writer or reader concurrently holds a non-exclusive lock on the same MD page and can also modify the same reference count as the first writer. More generally, a first writer can hold a non-exclusive lock on a first MD page including the reference count while the second writer also holds a non-exclusive lock on the same first MD page as the first writer, where both the first writer and the second writer can concurrently update or modify the first MD page.

In at least one embodiment, such multiple transactions or threads concurrently holding a non-exclusive lock on the same MD page can include multiple writers that can concurrently add multiple instructions to the MD log to modify the same reference count of the MD page. Because the lock is non-exclusive, a first writer holding a non-exclusive lock on the MD page can add an instruction to the MD log to modify the reference count while a second writer concurrently holds a non-exclusive lock on the same MD page to also add an instruction to the MD log to modify the reference count or other portion of the same MD page.

The techniques of the present disclosure can be used in connection with updates to the reference count as used in connection with deduplication as well as, more generally, other types of suitable updates.

In at least one embodiment, the techniques of the present disclosure can be used in a log based or log structured system. In one such embodiment, client or user updates, such as host writes to logical addresses of one or more logical devices or volumes, can be persistently stored in a log or journal of recorded client operations. Subsequently, the logged client operations can be flushed from the log or journal where the client updates can be applied to user data or content stored on non-volatile backend storage. Also, updates to the MD page can be stored in a metadata log, where the logged MD update is persistently stored and where the logged MD update is also stored in an in-memory log structure. In the in-memory log structure in at least one embodiment, each individual update to a particular MD page can be recorded as a separate entry in a bucket of updates associated with the particular MD page. Subsequently, the updates to the MD page as recorded in the metadata log can be flushed and applied to a persistently stored copy of the MD page. Logging the MD updates and client updates can result in improved performance.

In accordance with the techniques of the present disclosure in at least one embodiment, the properties and use of the reference count can be such that a majority of the reads of the reference count of the MD page may not require an exact up to date value of the reference count. In such an embodiment, the computation of the exact value of the reference count can be deferred and selectively performed when needed. In such an embodiment, threads, processes or other executing code entities reading the reference count of the MD page may also not care about the order in which updates or writes are performed to the reference count. Rather, such threads or processes accessing the reference count for reading can generally want an accurate, valid, uncorrupted value of the reference count independent of the order in which updates are made to the reference count. In at least one embodiment, the updates can include one or more increment operations and/or one or more decrement operations.

In at least one embodiment where threads or processes accessing the reference count of the MD page do not care about the order in which updates or writes are performed to the reference count, access to the MD page can be using a shared or non-exclusive lock on the MD page. Additionally, in at least one embodiment, a spinlock that is local to a node can be used to update a cached copy of the MD page stored in a node-local cache of the node. The non-exclusive lock on the MD page can be used in accordance with the techniques of the present disclosure to generally allow multiple threads or processes to concurrently access the MD page which can include concurrently accessing a persistently stored version of the MD page (such as stored on back-end non-volatile storage) for reading and writing, as well as concurrently accessing the cached copy of the MD page for reading. The non-exclusive lock on the MD page can be used to allow multiple threads concurrent access to the MD page. Additionally, if a first of the multiple threads now wants to write or update the cached copy of the MD page, the first thread can be required to hold the non-exclusive lock on the MD page and also acquire and hold a dedicated spinlock associated with the cached copy of the MD page. In at least one embodiment, the spinlock can be a node-local spinlock for the MD page. In at least one embodiment, the spinlock can be a dedicated spinlock associated with the node-local cached copy of the MD page where, for example, the multiple readers and the single writer can execute on the same node having the dedicated spinlock associated with the cached copy of the MD page including the reference count. Thus, the first writer thread can hold a non-exclusive or shared lock on the MD page as well as the spinlock on the cached copy of the MD page while other reader threads hold the non-exclusive or shared lock on the MD page. The spinlock of the MD page can be used to grant the first thread (holding the non-exclusive lock of the MD page and the spinlock of the MD page) exclusive access to the cached copy of the MD page, and thus exclude other threads (holding the non-exclusive lock of the MD page) from accessing the cached copy of the MD page while the first writer thread is updating the cached copy of the MD page. Thus the combination of the non-exclusive lock associated with the MD page and the spinlock associated with the cached copy of the MD page can allow for the single writer to have exclusive write access to the cached copy of the MD page. In this manner, the single writer can update the reference count of the cached copy of the MD page in a manner that provides for maintaining the data integrity of the reference count by excluding other writers. The updates to the reference count can include one or more increment reference count operations and/or one or more decrement reference count operations, where such operations are allowed to be performed in any order, thereby in an order independent manner.

Also generally, in other instances where a thread or other entity requires an exact value of the reference count and depends on the order in which updates applied the reference count, the thread or other entity can be required to first acquire and hold an exclusive lock for the MD page to exclude all other access to the MD page and provide the thread or other entity with exclusive access to the MD page. The techniques of the present disclosure can be used for updating the reference count of the MD page where threads reading the value of the reference count from the MD page want the value to be valid, consistent and uncorrupted but do not require an exact value of the reference count, and do not care about the order in which updates are applied. The techniques of the present disclosure can be used for updating the reference count of the cached MD page where threads reading the value of the reference count from the cached copy want the value to be valid, consistent and uncorrupted but do not require an exact value of the reference count, and do not care about the order in which updates are applied. In such an embodiment in instances where the thread cares about the order in which reads and/or write accesses are performed for the reference count, it can be the responsibility of the thread performing the update or other operation to acquire and hold the exclusive lock for the MD page thereby providing the thread with exclusive access to the MD page (e.g., excluding both readers and writers from accessing the MD page while the thread holds the exclusive access such as through use of a write or exclusive lock on the MD page).

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16*a*-*n*). The DAs can also be characterized as back end components of the data storage system which interface with the physical data storage devices.

One or more internal logical communication paths exist between the device interfaces 23, the RAs the HAs 21, and the memory 26. An embodiment, for example, uses one or more internal busses and/or communication modules. In at least one embodiment, the global memory portion 25*b* is used to facilitate data transfers and other communications between the device interfaces, the HAs and/or the RAs in a data storage array. In one embodiment, the device interfaces 23 performs data operations using a system cache included in the global memory 25*b*, for example, when communicating with other device interfaces and other components of the data storage array. The other portion 25*a* is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a*-*n* also through the channels. The host systems 14*a*-*n* do not address the drives or devices 16*a*-16*n* of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* used to manage and monitor the data storage system 12. In one embodiment, the management system 22*a* is a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16*a*-16*n*. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
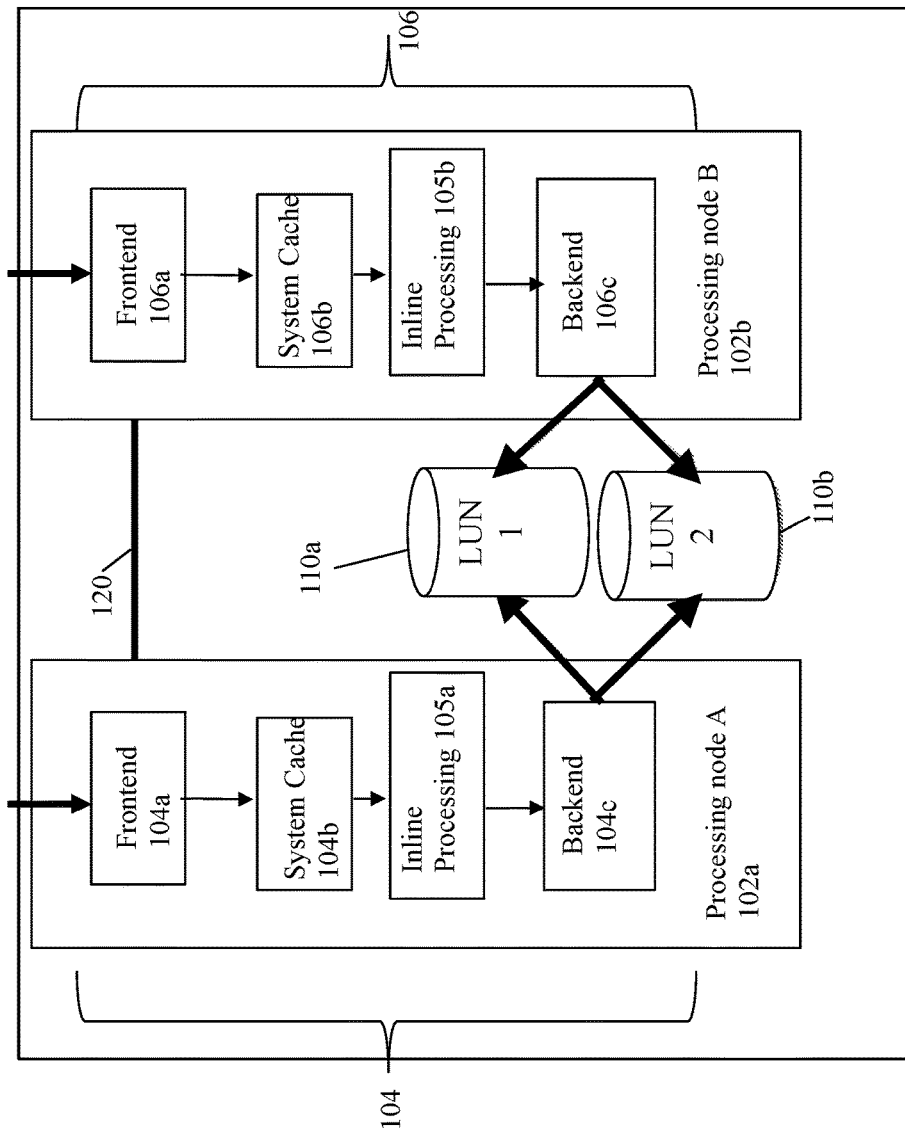
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a*-*b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
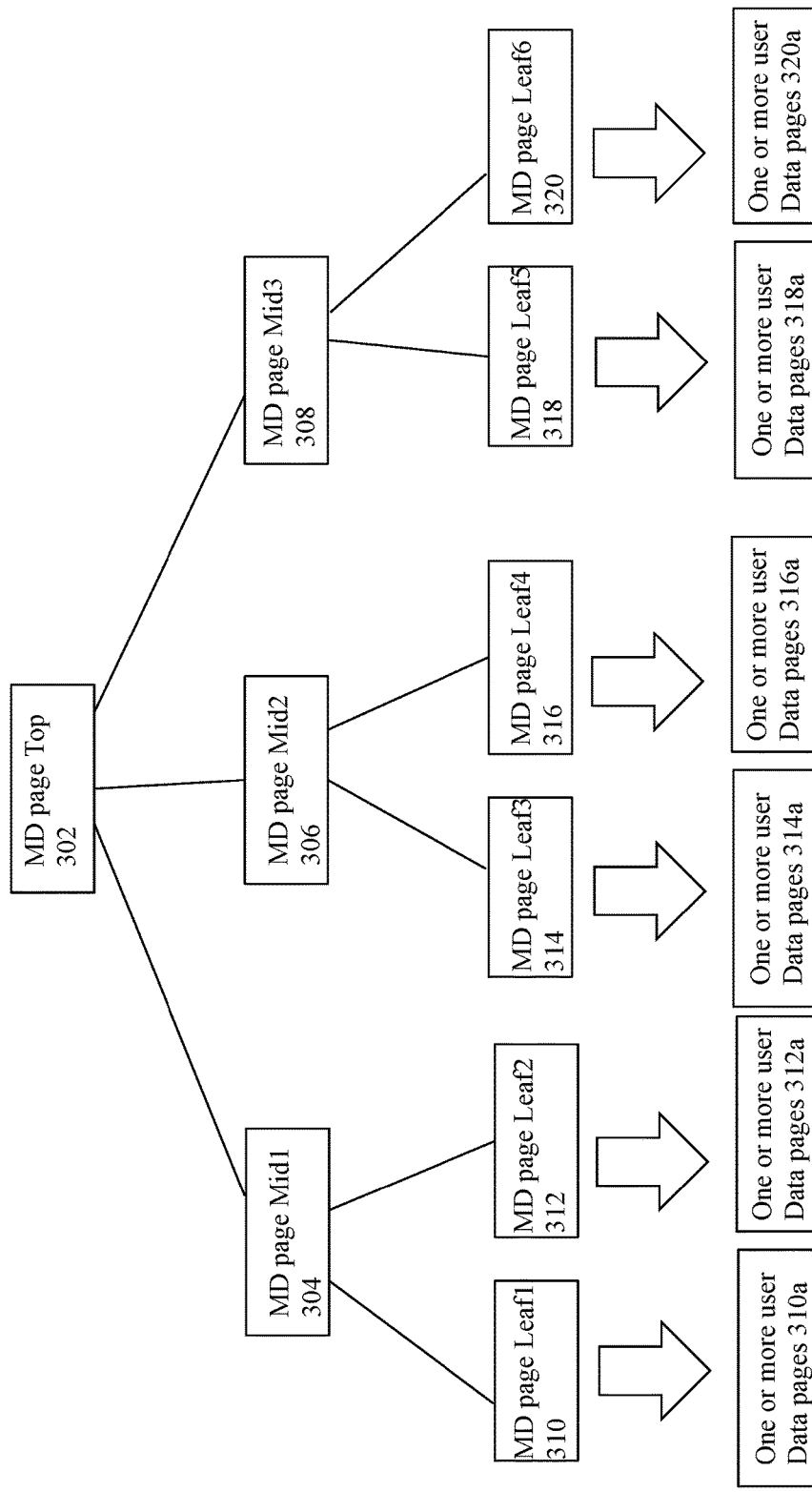
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
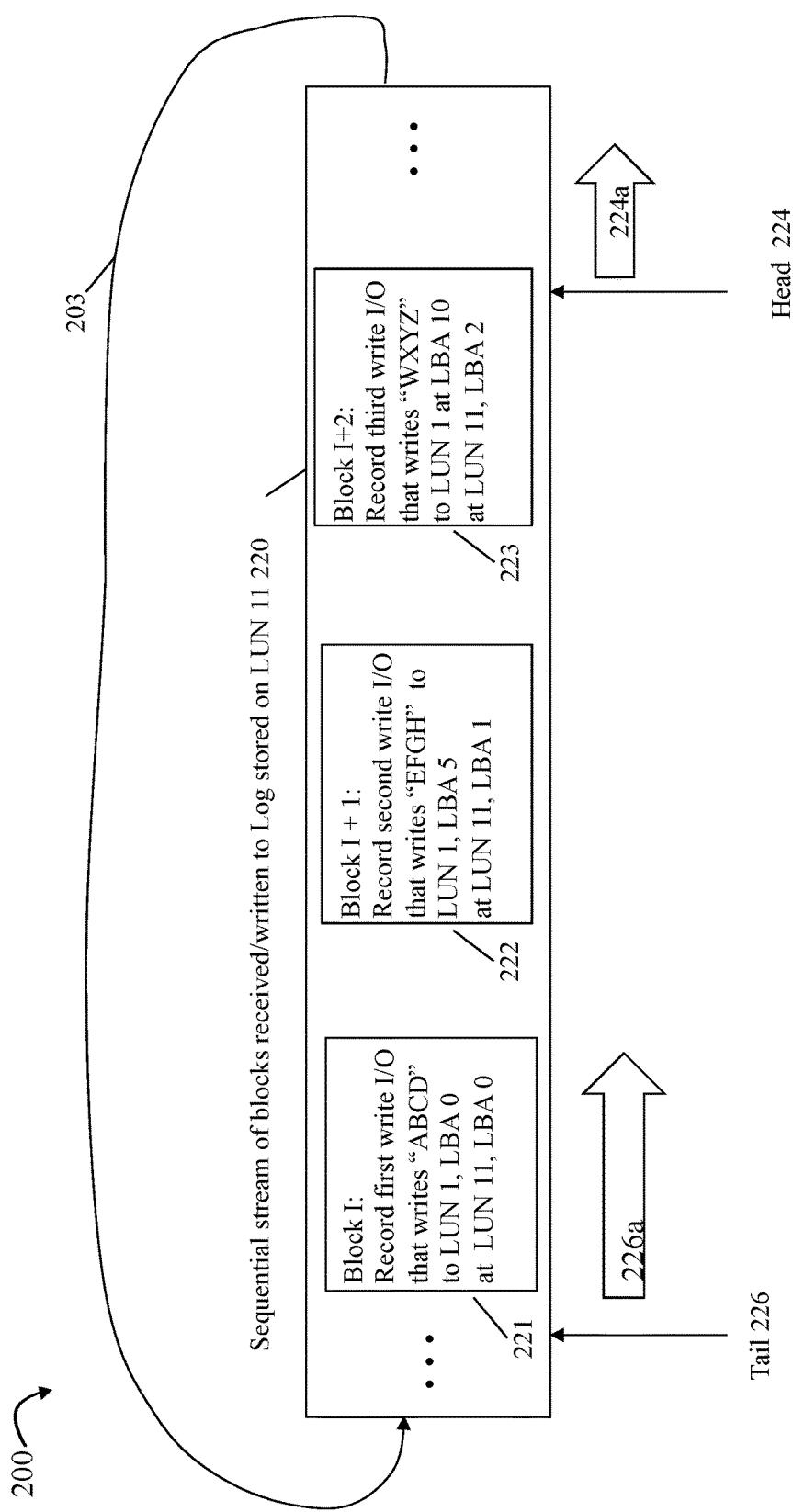
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224*a* to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226*a* sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
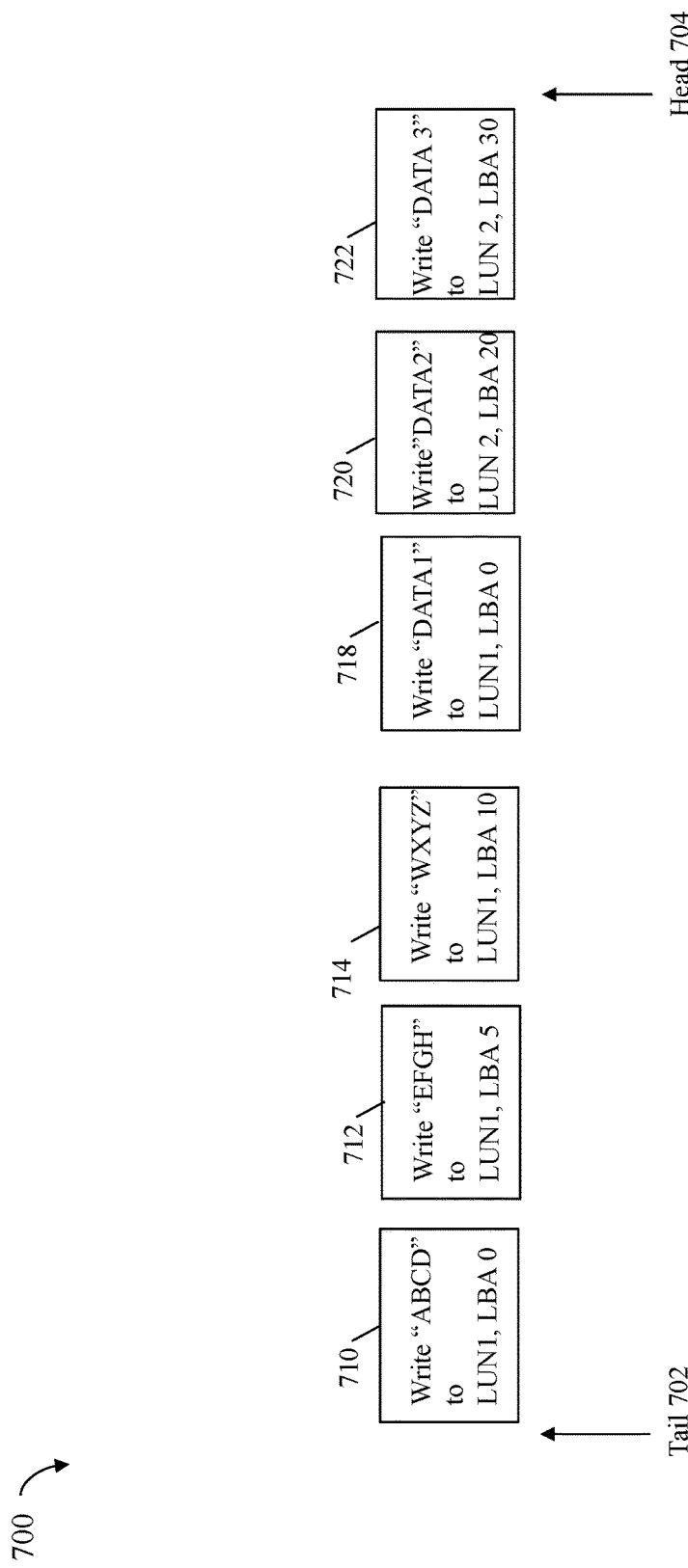

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
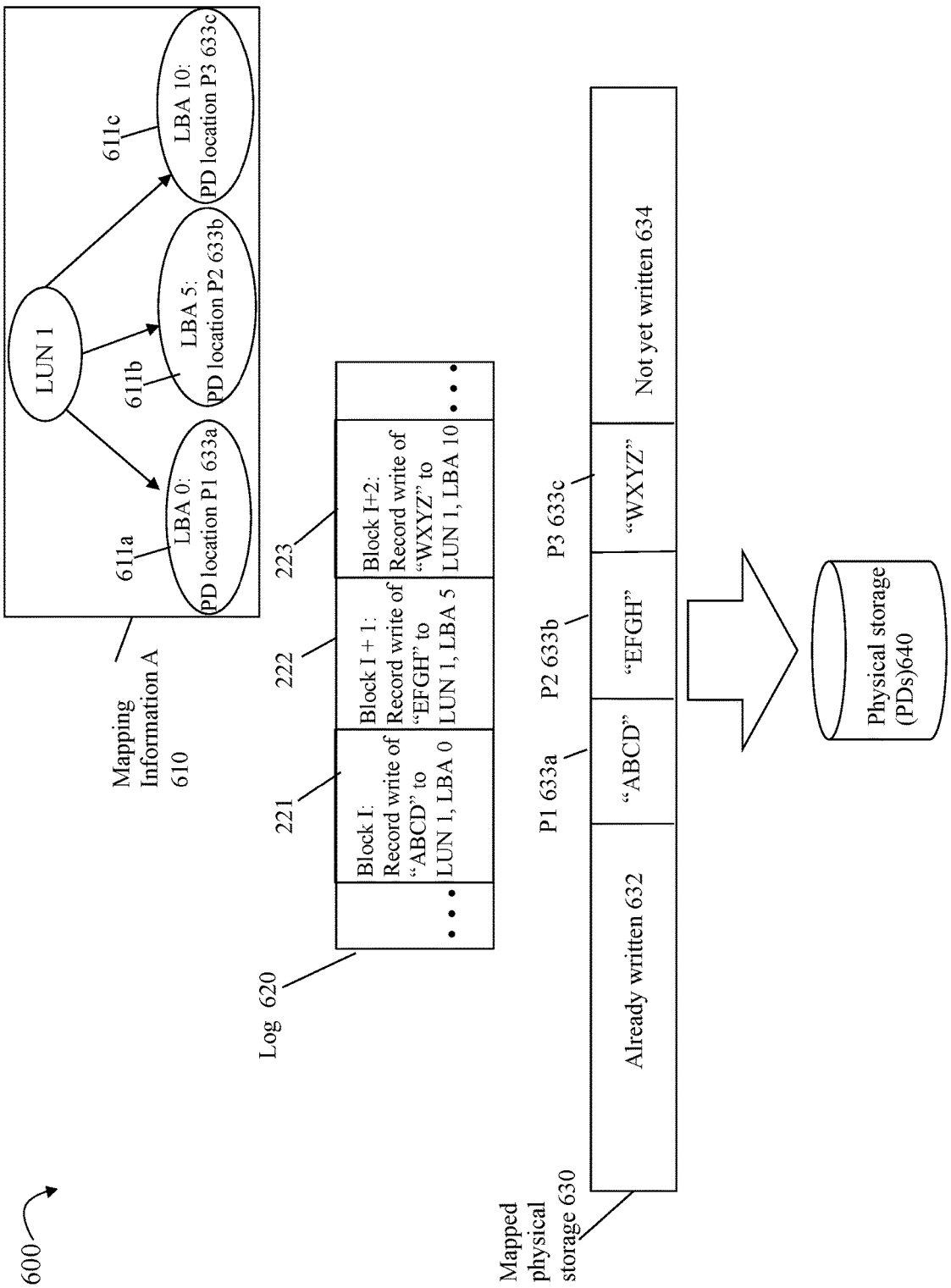

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
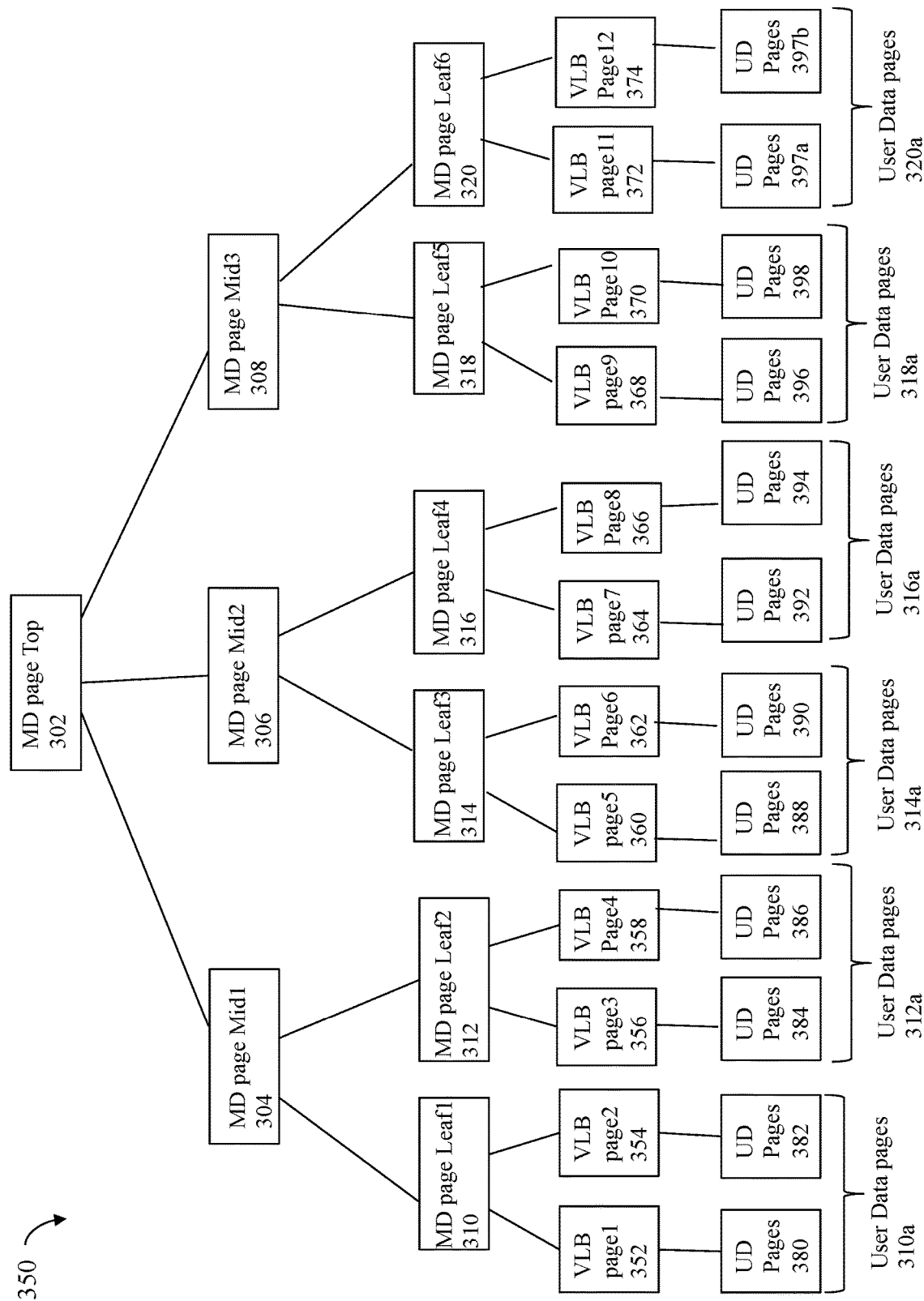

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
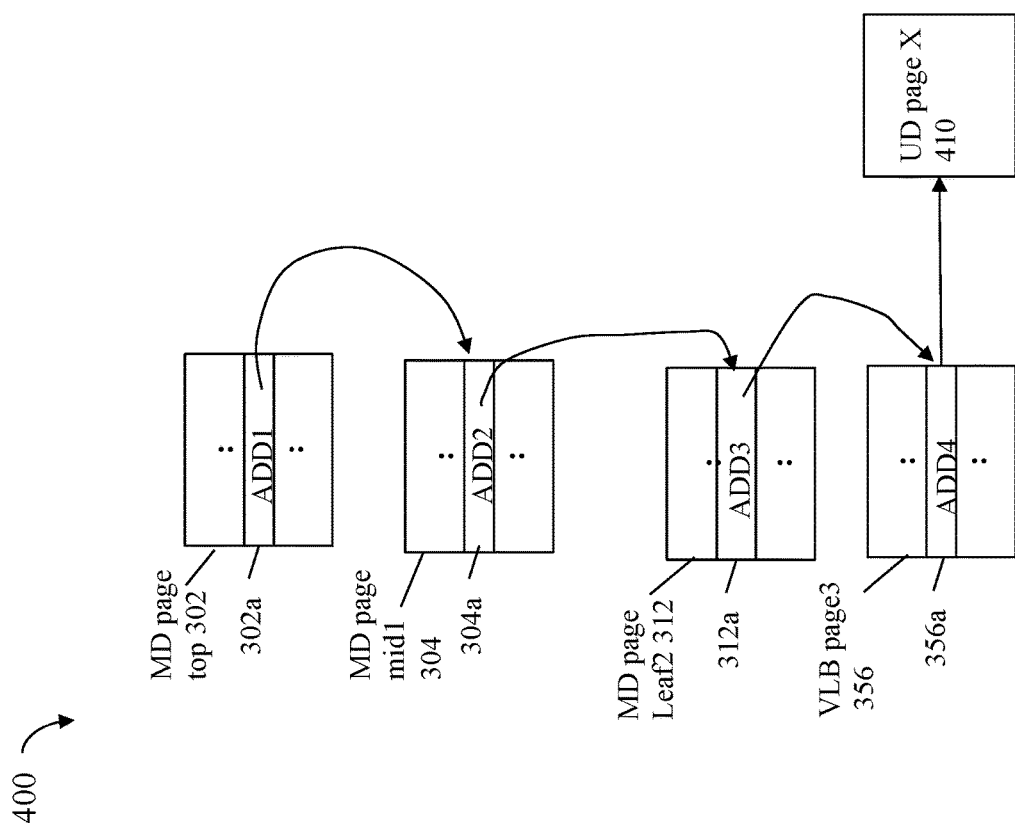

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
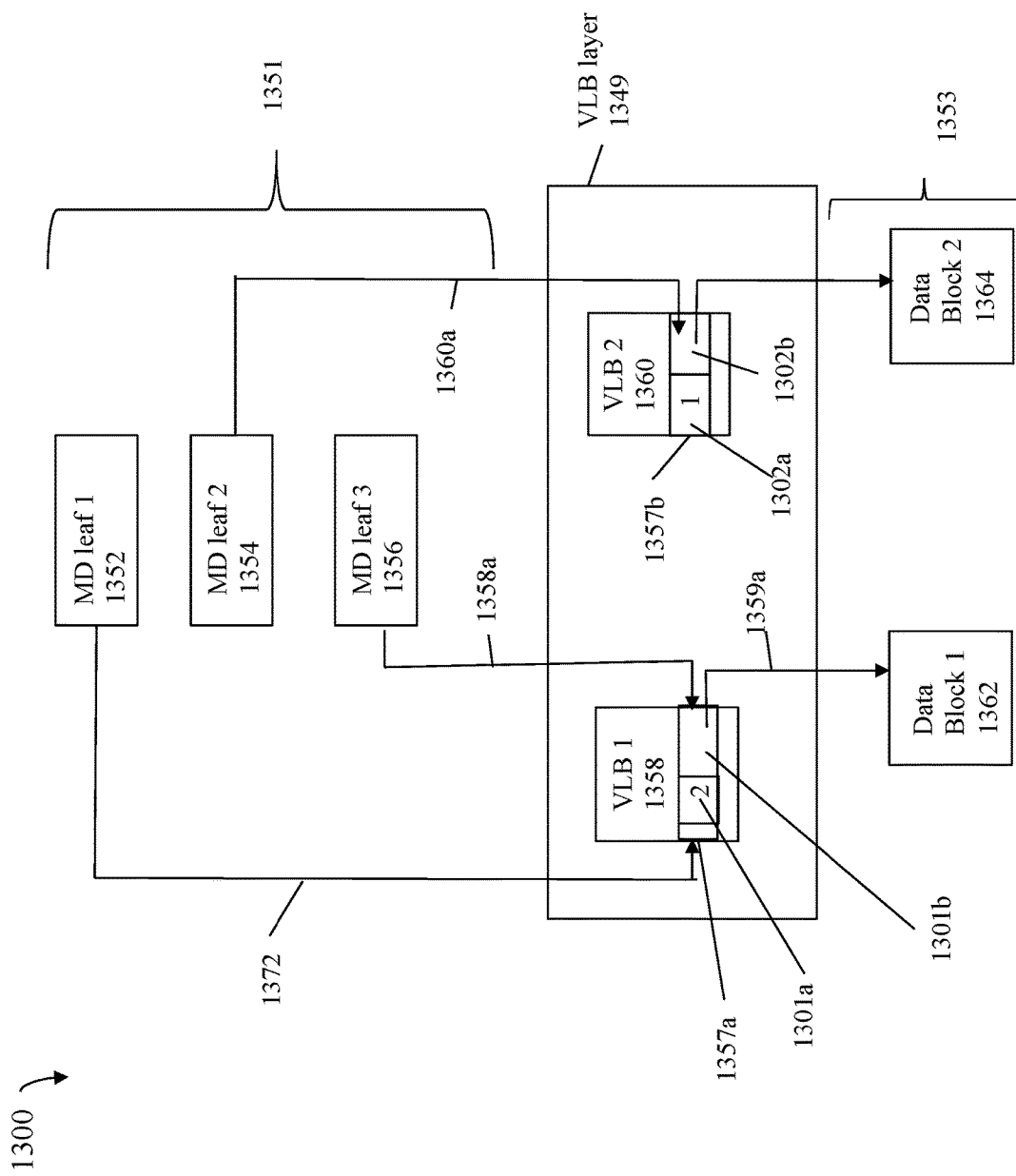

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357*a* of the VLB 1358. The two MD leaf nodes 1352 and 1356 both referencing the same data block 1362 indirectly through use of the same VLB entry 1357*a* can be a mapping resulting from data deduplication processing. In the example 1300, MD leaf node 1354 points to the entry 1357*b* of the VLB 1360 whereby the entry 1357*b* of the VLB2 1360 then further references or points to the data block 1364. The data blocks 1362, 1364 can denote user data blocks as described herein.

The element 1358*a* denotes a pointer to, or address of, the entry 1357*a* in the VLB 1358 used in connection with obtaining the data block 1362 stored on a particular LUN and LBA of the LUN. The pointer 1358*a* can be used as the virtual or indirect pointer in connection with obtaining the data block 1362. In at least one embodiment, the VLB 1358 can be a VLB page or node as described herein. Thus, in such an embodiment, the virtual or indirect pointer 1358*a* can be a pointer to the entry 1357*a* of the VLB structure 1358, where the entry 1357*a* can further include fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1372 denotes a pointer to, or address of, the entry 1357*a* in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357*a* of the VLB structure 1358, where the entry 1357*a* can further include the fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1360*a* denotes a pointer to, or address of, the entry 1357*b* in the VLB 1360 used in connection with obtaining the data block 1364 stored on a particular LUN and LBA of the LUN. The pointer 1360*a* can be used as the virtual or indirect pointer in connection with obtaining the data block 1364. Thus, in such an embodiment, the virtual or indirect pointer 1360*a* can be a pointer to the entry 1357*b* of the VLB structure 1360, where the entry 1357*b* can further include the fields 1302*a* and 1302*b*. The field 1302*b* can be a pointer to, or address of, the user data block 1364. The field 1302*a* can be a reference count or counter indicating the number of instances of, or references to, the particular data block 1362 (e.g., data block pointed to by 1302*b*).

The reference count 1301*a* can be initialized to 1 when a first or initial instance of the associated data block 1362 is stored. In this example, the reference 1301*a* is 2 indicating that there are 2 instances of the data block 1362 and thus 2 references to the data block 1362. In this case, the are 2 instances of the data block 1362 in stored user data. The instances denoted by the reference count 1301*a* include all deduplicated instances corresponding to entries of the MDL leaves 1352, 1356 that respectively point 1372, 1358*a* to the VLB entry 1357*a* associated with the single copy of the data block 1362.

The reference count 1302*a* can be initialized to 1 when a first or initial instance of the associated data block 1364 is stored. In this example, the reference 1302*a* is 1 indicating that there is 1 instance of the data block 1364 and thus 1 reference to the data block 1364. The instances denoted by the reference count 1302*a* generally include any/all deduplicated instances associated with the single copy of the data block 1364. However, in this example, there is only a single reference to, and single instance of, the data block 1364 in stored user data. In particular, the MD leaf 1354 references or points (1360*a*) to the VLB entry 1357*b* associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing in at least one embodiment, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 or 64 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7A:
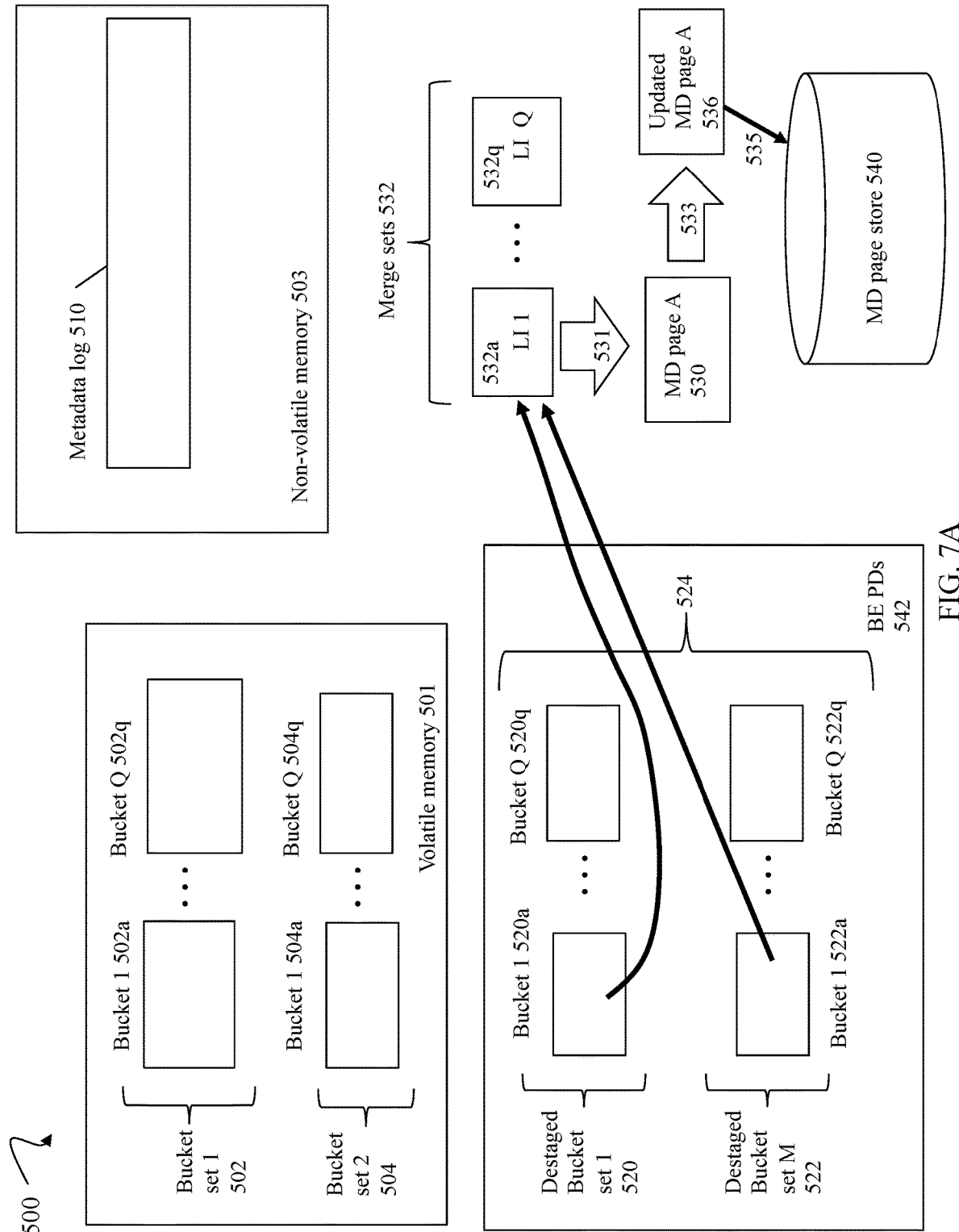
FIG. 7A is an example illustrating structures and associated data flow in at least one embodiment in accordance with the techniques of the present disclosure.

Referring to FIG. 7A, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update 0 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, 6 and 7A, the reference count associated with a data block can be included in an entry of a VLB page associated with the data block. For example with reference to FIG. 6, the VLB entry 1357*a* includes a field 1301*a* with the reference count=2 for the associated data block 1362; and the VLB entry 1357*b* includes a field 1301*a* with the reference count=1 for the associated data block 1364.

The reference count such as of the VLB entries 1357*a*, 1357*b*, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

In some existing systems, updating MD such as the reference count can be performed by obtaining an exclusive lock or a write lock providing exclusive access to the MD page including the reference count and also updating the reference count atomically such as using an atomic read-modify-write operation in order to guarantee data consistency. In some applications, the same data or content can be written by multiple writes to many different logical addresses within a relatively short time period. Although deduplication processing can optimize and reduce non-volatile physical storage used to store the duplicate content that is written by the multiple writes, there is also additional contention when processing the multiple writes. In particular, there is additional contention to obtain exclusive access by acquiring the exclusive lock to the same MD page including the reference count that is updated with each additional reference to the same single copy of the written data. The foregoing can cause multiple deduplication transactions processing the multiple writes to queue and block waiting to acquire the same exclusive lock providing exclusive access to the same MD page with the reference count. As a result, the performance of the system can be adversely impacted. Additionally, the adverse impact can be greater, for example, if data deduplication is performed across multiple nodes of the same system where the lock access to the same MD page with the reference count is synchronized across the multiple nodes.

In at least one system, updates to the MD page can be stored in a metadata log as discussed elsewhere herein, where the logged MD update can be persistently stored and where the logged MD updated can also be stored in an in-memory log structure. In the in-memory log structure in at least one embodiment, each individual update to a particular MD page can be recorded as a separate entry in a bucket of updates associated with the particular MD page. Subsequently, the updates to the MD page as recorded in the log can be flushed and applied to a persistently stored copy of the MD page. Logging the MD updates, such as to the reference count of the MD page, to the metadata log can result in improved performance.

In accordance with the techniques of the present disclosure in at least one embodiment, the properties and use of the reference count can be such that a majority of the reads of the reference count of the MD page may not require an exact up to date value of the reference count. In such an embodiment, threads or processes reading the reference count of the MD page may also not care about the order in which updates or writes are performed to the reference count. Rather, such threads or processes accessing the reference count for reading can generally want an accurate uncorrupted value of the reference count independent of the order in which updates are made to the reference count.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the BE PD physical location storing the old data or existing content (e.g., no physical in place update). Rather, the newly written or updated data is typically written to a different physical location on the BE PDs Thus, the BE PDs can retain the valid old data in the original physical location for some time before being reclaimed for reuse by garbage collection processing.

Garbage collection can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

In some conventional systems where all writes or updates to the MD are performed under an exclusive lock to the MD page, the reference count associated with a data block storing user data or content can be zero when the data block is no longer referenced. For example with reference to FIG. 6, assume the reference count $1302a$ of the VLB entry $1357b$ is zero. In this case, there would be no MD leaf referencing or pointing to the VLB entry $1357b$ and processing can be performed to initialize or invalidate the pointer $1302b$ to the data block $1364$ and also to deallocate the associated data block $1364$ no longer referenced or mapped to a logical address. In such an embodiment not using the techniques of the present disclosure, reading a reference count less than zero can denote an invalid, inconsistent and erroneous state. Further in such an embodiment not using the techniques of the present disclosure, reading a reference count of zero can also denote an invalid, inconsistent and erroneous state since, responsive to the reference count $1302a$ being zero, the associated data block pointer $1302b$ of the VLB entry $1357b$ can be invalidated or reinitialized, such as to null, and the associated data block $1364$ can be deallocated or freed for reuse. More generally, the VLB entry $1357b$ and the associated data block $1364$ can be reclaimed, freed or made available for reuse.

In at least one embodiment in accordance with the techniques of the present disclosure using a non-exclusive or shared lock to update the reference count $1302a$ of the MD page $1360$, the reference count $1302a$ associated with the data block $1364$ storing user data or content can be decremented to zero, or more generally have a value less than one, and can denote a transient valid state rather than an invalid, inconsistent error state. In a log structured system using respective logs for both storing user data updated and metadata updates, both the data block $1364$ and the pointer $1302b$ of the VLB entry $1357b$ referencing the data block $1364$ can be valid and usable until physically moved, initialized and/or overwritten in connection with storage reclamation such as with garbage collection. The foregoing is true even if the reference count $1302a$ has a value that is less than one. In this case in at least one embodiment in accordance with the techniques of the present disclosure, it is possible to have a value of the reference count $1302a$ generally be less than one (e.g., zero and also less than zero) and also have the pointer $1302b$ of the VLB entry $1357b$ referencing the data block $1364$ since such a value of the reference count $1302a$ can denote a valid transient state of the reference count $1302a$. In this manner in such an embodiment in accordance with the techniques of the present disclosure, a reader can hold the non-exclusive lock on the MD page VLB $1360$ with the reference count $1302a$ of zero (or generally less than one) and the pointer $1302b$ of the VLB entry $1357b$ can validly reference the data block $1364$. The pointer $1302b$ can continue to reference or point to the data block $1364$ until, for example, the data block $1364$ and/or VLB entry $1347b$ are deallocated, moved, reinitialized and/or reclaimed in connection with storage reclamation such as for garbage collection. When the MD page $1360$ is accessed for storage reclamation, the storage reclamation processing can perform its processing of the MD page $1360$ while holding the exclusive lock on the MD page $1360$, where the MD page $1360$ can be reclaimed when the reference count is zero. In this manner, the reference count $1302a$ and the associated data block $1364$ can be used and can denote valid usable consistent data even in cases where the reference count $1302a$ is less than one. In such an embodiment in accordance with the techniques of the present disclosure using a non-exclusive lock on the MD page $1360$, a read I/O operation can still be processed when the reference count $1302a$ is less than 1 by accessing the stored content of the data block $1364$ using the pointer $1302b$.

Using the techniques of the present disclosure, the reference count $1302a$ of the target page $1360$ can be incremented and decremented without the need for exclusive access. Rather, to perform such updates to the reference count $1302a$, the target page $1360$ can be accessed using a shared or non-exclusive lock for the target page allowing for many concurrent data deduplication transactions, either on the same node or across nodes, to concurrently access the target page $1360$. In such an embodiment, the lock on the target page, such as the MD or VLB page $1360$, can be characterized as global in that the lock state can be synchronized across all the nodes in a multi-node system, such as the dual node system or appliance described herein, and thus can require internode communication and internode synchronization. In another aspect, the lock state of the target page can be characterized as global in that it can also apply to accessing any node-local cached copies of the target page and also to the persistent copy of the target page as stored, for example, in the MD page store of the BE PDs. Thus, performing an operation on a lock of a target page, such as acquiring or releasing an exclusive lock for the target page, or acquiring or releasing a non-exclusive lock for the target page, can require internode synchronization. Further, if an entity, such as a thread on node A, requests and acquires an exclusive lock (e.g., for exclusive access) to a target page, no other thread on node A or node B is allowed to access the target page (as stored in any node local cache or as stored in the MD page store) while the thread of node A holds the exclusive lock. In at least one embodiment where the thread of node A holds the exclusive lock to the target page, no other entity can be allowed to update the target page other than the node A (e.g., only node A can write to the target page and store writes or updates to the target page in the metadata log).

Generally, multiple threads can each hold a non-exclusive lock on the MD page including the reference count, where all such threads are allowed to access the MD page, as stored in the node-local cache or as stored in the MD page store. In accordance with the techniques of the present disclosure, multiple threads each holding a non-exclusive lock on the MD page can be allowed to concurrently write to the MD page and thus concurrently record MD page updates, such as to the same reference count, in the metadata log. When one of the threads, a writer thread, holding the non-exclusive lock on the MD page wants to update the reference count as stored in a cached copy of the MD page, the writer thread can also acquire a spinlock on the node-local cached copy of the MD page. Thus, the writer thread can perform updates to the node-local cached copy of the MD page while holding the non-exclusive lock on the MD page and while also holding the node-local spinlock on the node-local cached copy of the MD page. In at least one embodiment, the spinlock on the MD page can be implemented as a node-local spinlock providing for exclusive access to the node's local cached copy of the MD page. Implementation of such a node-local spinlock for the node-local cached copy of the MD page can be performed per node and does not require internode synchronization or communication. Thus the node-local spinlock can be used to provide node-local protection and synchronization with respect to the cached copy of a MD page as stored in the node's local cache of volatile memory. Multiple threads can currently hold the non-exclusive lock for the MD page.

The node-local spinlock for the node-local cached copy of the MD page can be acquired and held by a writer (also concurrently holding a non-exclusive lock on the MD page) to serialize updates to the cached copy of the MD page, where such updates can be applied to the cached copy of the MD page and also logged in the metadata log.

In accordance with the techniques of the present disclosure performing updates to the MD page using a non-exclusive lock, multiple concurrent updates to the MD page can be performed in any order as a result of race conditions where the net, final or cumulative resulting reference count is correct. However, any intermediate state or value of the reference count can also be considered valid. For example, a reference count can have a starting value of +1 and the updates can include an increment +1 (where the reference count is incremented by 1) and a decrement −1 (where the reference count is decremented by 1). Since the foregoing increment and decrement can be performed in any order, the decrement can be performed before the increment so that, after applying the decrement −1 to the reference count, the reference count has a value of 0. Subsequently the increment +1 can be applied resulting in a final value of +1. This is discussed in more detail below.

In at least one embodiment, an exclusive lock on the VLB page 1360 can be acquired and held while performing, for example, storage reclamation, such as in connection with garbage collection of the VLB page 1360, as well as other operations which require exclusive access to the VLB page and/or which care about the order in which increments and/or decrements are applied to the reference count.

For purposes of further illustration of the techniques of the present disclosure and with reference to FIGS. 6 and 7A, assume that a first write operation is performed that writes first data to a first target logical address, and inline deduplication processing is performed for the first write operation and determines that the first data is a duplicate of the contents stored in the data block 1364. In this case, deduplication processing includes associating the first target logical address with the data block 1364 and also incrementing the reference count 1302*a* for the data block 2 1364. Assume further with reference to FIG. 7A that the MD update to the reference count 1302*a* of the entry 1357*b* of the VLB 1360 for the first write operation is recorded as a first MD update in the metadata log. For example, the first MD update can be represented as a first tuple, an increment reference (inc ref) tuple, where the first tuple is stored as an entry in a corresponding bucket, such as the bucket 502*a*, in the active bucket set, such as the bucket set 502. More generally the first MD update to increment the reference count 1302*a* of the MD page 1360 for the first write operation can be performed while holding a non-exclusive lock on the MD page 1360, where the MD update to the MD page 1360 can be recorded as an entry in the metadata log. Additionally, the MD page that is updated, such as in this example the VLB page 1360, can be stored in a cache, such as a node-local cache of the volatile memory 501 of the node A.

Also for this example, a second write operation is performed that writes second data to a second target logical address. The second write operation can occur in time subsequent to the first write operation. Currently prior to the second write operation, the second target logical address stores the content of the data block 1364 which is now replaced with the new second data. In this case, deduplication processing can determine that the second data is a unique data block and can store the second data in a new data block with its own associated VLB entry, and other MD structures or mapping information in a manner consistent with other discussion herein. Additionally, processing the second write operation includes decrementing the reference count 1302*a* for the data block 2 1364 since the content of the data block 1364 is no longer stored at the second target logical address. Assume further with reference to FIG. 7A that the reference count decrement is a second MD update to the reference count 1302*a* of the entry 1357*b* of the VLB 1360 for the second write operation, where the second MD update can be represented as a second tuple, decrement reference (dec ref) tuple, and where the second tuple is stored as an entry in a corresponding bucket, such as the bucket 502*a*, in the active bucket set, such as the bucket set 502. More generally the second MD update to decrement the reference count 1302*a* of the MD page 1360 for the second write operation can be performed while holding a non-exclusive lock on the MD page 1360.

Figure 7B:
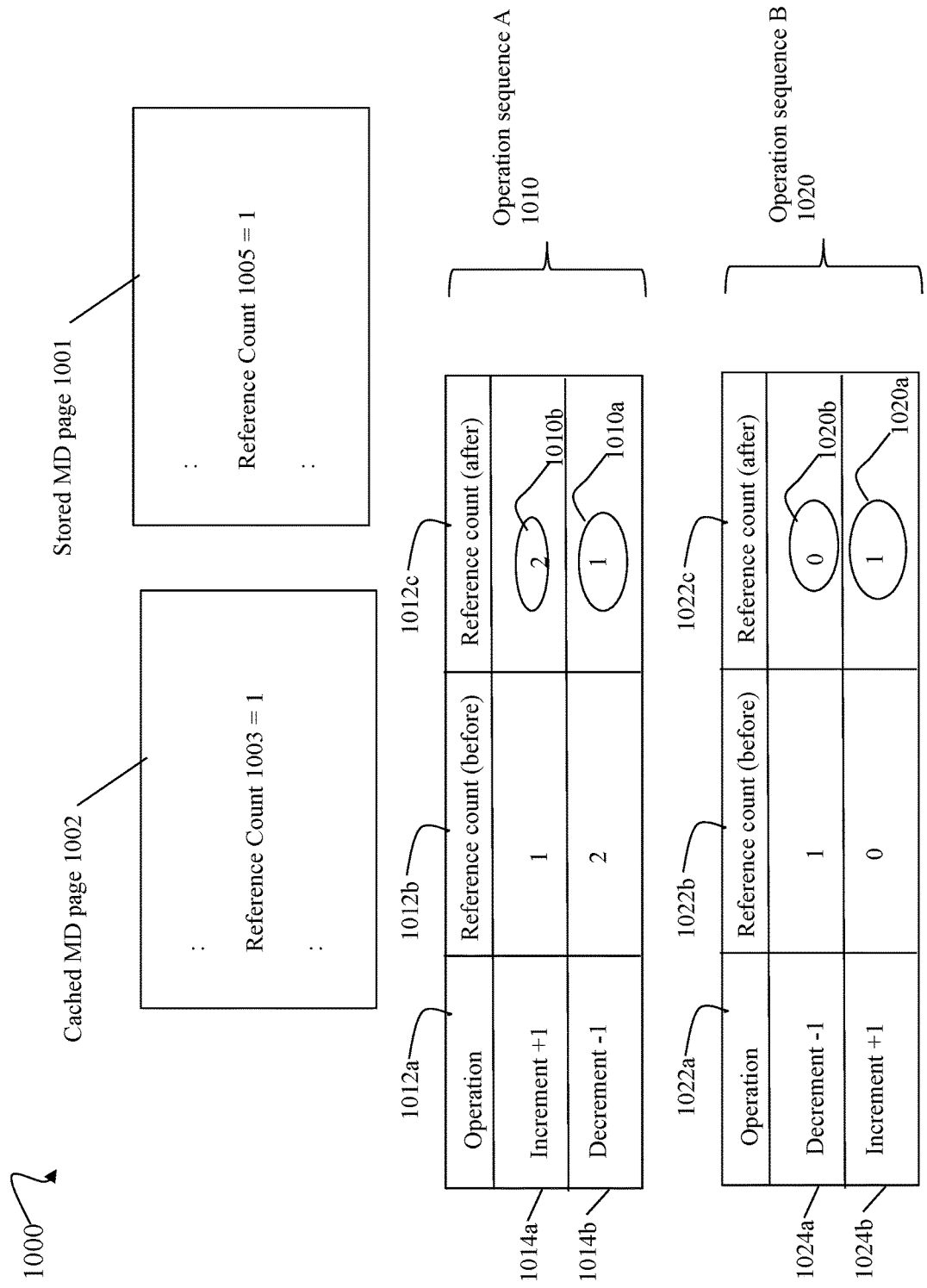
FIGS. 7B and 7C are examples illustrating possible reference count values and associated update operation sequences updating the reference count using a non-exclusive lock on a page including the reference count in at least one embodiment in accordance with the techniques of the present disclosure.

Now referring to FIG. 7B, shown is an example 1000 illustrating different sequences in which the above-noted inc ref and dec ref operations, respectively, of the first and second write operations can be performed in connection with the reference count 1302*a* of FIG. 6 in at least one embodiment in accordance with the techniques of the present disclosure.

The cached MD page 1002 can denote a cached copy of the MD page or VLB page 1360 of FIG. 6 as stored in node A's local volatile memory cache. The reference count 1005 can denote the current value of 1 of the reference count 1302*a* prior to performing the first and second write operations.

The element 1001 can denote the MD page, the VLB page 1360, as stored, for example, persistently in the MD page store 340 on the BE PDs. The reference count 1003 can denote the current value of 1 of the reference count 1302*a* prior to performing the first and second write operations.

In connection with the example 1000, assume that a first thread is processing the first write operation and, in particular, for the inc ref operation of the first write operation; and assume that a second thread is processing the second write operation and, in particular, for the dec ref operation of the second write operation. The first thread and the second thread can both be executing on the same node A and both the first thread and the second thread can hold a non-exclusive lock to the VLB page 1360, where the cached MD page 1002 denotes the cached copy of the VLB page 1360 as stored in node A's local volatile memory cache. Both the first and second threads each concurrently holding a non-exclusive lock on the VLB page 1360 can concurrently update the reference count of the VLB page 1360. Thus, the first thread can store in the metadata log a first entry for an inc ref to increment the reference count 1302a by 1; and the second thread can store in the metadata log a second entry for a dec ref to decrement the reference counter 1302a by 1. Since the foregoing incr ref operation and dec ref operation are concurrently performed under a non-exclusive lock for the VLB page 1360, a particular strict sequential order in which the operations are performed is not guaranteed. As a result, it is a race condition as to the order in which the inc ref and dec ref operations are performed with respect to the reference counter 1302a of the VLB page 1360. Thus, although the second write operation can occur in time subsequent to the first write operation, there is no guarantee using the non-exclusive lock of the VLB page 1360 regarding the particular sequence or order in which the inc ref and dec ref operations are performed with respect to the reference count 1302a of the VLB page 1360.

Additionally, in order for the first thread and the second thread to update the reference count 1005 of the cached MD page 1002, each thread must acquire and hold a non-exclusive lock for the VLB page 1360 and also acquire and hold a node-local spinlock for the cached MD page 1002 (e.g., cached copy of the VLB 1360).

Due to the race conditions associated with concurrently updating the reference count 1005 of the MD page 1001, discussion below considers the two possible sequential orders in which the inc ref and dec ref can be performed.

As a first scenario, assume that the operation sequence A 1010 denotes the sequence or order in which the inc ref and then the dec ref operations are performed with respect to the reference count 1005. The operation sequence A 1010 includes a table with a first column 1012a denoting the operation performed, a second column 1012b denoting the reference count value before applying an operation of a particular row, and a third column 1012c denoting the reference count value after applying the operation of the particular row. For example, the row 1014a indicates that the inc ref+1 operation is performed after the first thread acquires and holds the non-exclusive lock for the MD page 1001 (e.g., the VLB page 1360), where the reference count 1005=1 before the inc ref+1 operation is performed, and where the reference count 1005=2 after the inc ref+1 operation is performed.

In the first scenario following the inc ref operation represented in the row 1014a, the row 1014b indicates that the dec ref −1 operation is performed, after the second thread acquires and holds the non-exclusive lock for the MD page 1001 (e.g., VLB page 1360), where the reference count 1005=2 before the dec ref −1 operation is performed, and where the reference count 1005=1 after the dec ref −1 operation is performed. The element 1010a denotes the final reference count value of 1, where the reference count of 2 denoted by the element 1010b can represent an intermediate or transitory value of the reference count.

Additionally, in at least one embodiment, each of the first and second threads can perform processing in connection with the cached MD page 1002 denoting the cached copy of the MD page 1001 (e.g., the VLB page 1360). In at least one embodiment, both the first and second threads can perform processing to apply their respective updates to the reference count 1003 of the cached MD page 1002 in order to keep the cached copy 1002 up to date with the stored MD page 1001. The updates to the reference count 1003 of the cached page 1002 can be performed sequentially using a node-local spinlock providing exclusive access to the cached MD page 1002. For example, the first thread can increment by 1 the reference count 1003 of the cached MD page 1002 while holding the non-exclusive lock for the VLB page 1360 denoted as the MD page 1001 in FIG. 7B, and while also holding the spinlock on the cached MD page 1002. When the first thread completes the inc ref update of the reference count 1003, the first thread can release the spinlock on the cached MD page 1002 and can, as may be needed, continue to hold the non-exclusive lock for the VLB page 1360. In a similar manner, the second thread can decrement by 1 the reference count 1003 of the cached MD page 1002 while holding the non-exclusive lock for the VLB page 1360 denoted as the MD page 1001 in FIG. 7B, and while also holding the spinlock on the cached MD page 1002. When the second thread completes the dec ref update, the second thread can release the spinlock on the cached MD page 1002 and can, as may be needed, continue to hold the non-exclusive lock for the VLB page 1360. Thus, each of the first thread and the second thread can sequentially update the reference count 1003 of the cached MD page 1002 denoting the cached copy of the VLB page 1360 while both the first thread and the second thread concurrently hold a non-exclusive lock on the VLB page 1360.

As a second scenario, assume that the operation sequence B 1020 denotes the sequence or order in which the dec ref and then the inc ref operations are performed with respect to the reference count 1005. The operation sequence B 1020 includes a table with a first column 1022a denoting the operation performed, a second column 1022b denoting the reference count value before applying an operation of a particular row, and a third column 1022c denoting the reference count value after applying the operation of the particular row. For example, the row 1024a indicates that the dec ref −1 operation is performed after the second thread acquires and holds the non-exclusive lock for the MD page 1001 (e.g., the VLB page 1360), where the reference count 1005=1 before the dec ref operation is performed, and where the reference count 1005=0 after the dec ref operation is performed.

In the second scenario following the dec ref operation represented in the row 1024a, the row 1024b indicates that the inc ref operation is performed, after the first thread acquires and holds the non-exclusive lock for the MD page 1001 (e.g., VLB page 1360), where the reference count 1005=0 before the inc ref operation is performed, and where the reference count 1005=1 after the inc ref operation is performed. The element 1020a denotes the final reference count value of 1, where the reference count of 0 denoted by the element 1020b can represent an intermediate or transitory value of the reference count.

In connection with the operation sequence B 1020, each of the first and second threads can perform processing as discussed above in connection with the operation sequence A to apply their respective updates to the reference count 1003 of the cached MD page 1002 in order to keep the cached copy 1002 up to date with the stored MD page 1001.

Thus, as illustrated in the example 1000 with the operation sequence B 1020, the reference count 1005 of the MD page 1001 can have a value of 0 as denoted by 1020b. In this manner, it is possible for a third thread holding a non-exclusive lock to the VLB page 1360 (e.g., MD page 1001)

as well as the first thread also holding a non-exclusive lock to the VLB page 1360 to read a reference count value of 0 as denoted by 1020*b*. In such a case where the reference count value of 0 is read from the ref counter 1302*a* of the VLB 1360 of FIG. 6, the associated data block 1364 as well as the pointer 1302*b* to the associated data block 1364 are still valid despite the reference count 1302*a* have a value that is less than 1.

The example of FIG. 7B illustrates possible race conditions and associated sequences of operations with a single inc ref and as a single dec ref. More generally, the sequence of operations can consider any valid sequence of one or more inc refs and/or one or more dec refs. For example with reference to FIG. 7C, consider a start state with a reference count=1 as in FIG. 7B. Operations performed with respect to the reference count can include 2 dec refs and 2 inc refs. Due to race conditions, the foregoing 4 operations can be performed in any order. One valid sequence of operations to the reference count can be: dec ref−1, dec ref −1, inc ref+1, and inc ref+1 as denoted by the operation sequence C 1060. Another possible valid sequence of operations to the reference count can be: inc ref+1, inc ref+1, dec ref−1, and dec ref −1 as denoted by the operation sequence D 1070. It should be noted that with 4 operations as in the example 1050 of FIG. 7C, additional valid sequences or orderings of operations are possible though only 2 possible valid sequences 1060, 1070, are illustrated.

As a third scenario, assume that the operation sequence C 1060 denotes the sequence or order in which 2 dec ref operations followed by 2 inc refs are performed with respect to the reference count 1005. The operation sequence C 1060 includes a table with a first column 1062*a* denoting the operation performed, a second column 1062*b* denoting the reference count value before applying an operation of a particular row, and a third column 1062*c* denoting the reference count value after applying the operation of the particular row. Assume for illustration that the first thread performs the two dec refs and the second thread performs the two inc refs. For example, the row 1064*a* indicates that the dec ref −1 operation is performed after the first thread acquires and holds the non-exclusive lock for the MD page 1001 (e.g., the VLB page 1360), where the reference count 1005=1 before the dec ref −1 operation is performed, and where the reference count 1005=0 after the dec ref−1 operation is performed. Additionally, the first thread while holding the non-exclusive lock for the VLB page 1360 can then perform the second dec ref −1 operation denoted by the row 1064*b*, where the reference count 1005=0 before the second dec ref −1 operation is performed, and where the reference count 1005=−1 after the second dec ref−1 operation is performed.

Following completion of the two dec refs represented by the rows 1064*a*-*b*, the two inc refs represented by the rows 1064*c*-*d* can be performed after the second thread acquires and holds the non-exclusive lock for the VLB page 1360. As denoted by the row 1064*c*, the reference count 1005=−1 before the first inc ref+1 operation is performed, and where the reference count 1005=0 after the first inc ref operation is performed. Additionally, the second thread while holding the non-exclusive lock for the VLB page 1360 can then perform the second inc ref operation denoted by the row 1064*d*, where the reference count 1005=0 before the second inc ref operation, and where the reference count 1005=1 after the second inc ref operation is performed.

In connection with the operation sequence C 1060, each of the first and second threads can perform processing as discussed above in connection with the operation sequence A to apply their respective updates to the reference count 1003 of the cached MD page 1002 in order to keep the cached copy 1002 up to date with the stored MD page 1001.

Thus, as illustrated in the example 1050, the reference count 1005 of the MD page 1001 (e.g., VLB 1360) can have a valid value of 0 as denoted by 1060*a* and 1060*c* and also a valid value of −1 as denoted by 1060*b*. In this manner, it is possible for a thread holding a non-exclusive lock to the VLB page 1360 to read a valid reference count value that is less than 1 (e.g., as in 1060*a*-*c*). In such a case where the reference count value of 0 or −1 is read from the ref counter 1302*a* of the VLB 1360 of FIG. 6, the associated data block 1364 as well as the pointer 1302*b* to the associated data block 1364 are still valid despite the reference count 1302*a* have a value that is less than 1.

As a fourth scenario, assume that the operation sequence D 1070 is performed with the following sequence or order in which the 2 inc refs are performed by the second thread, and then the 2 dec refs are performed by the first thread with respect to the reference count 1005.

The operation sequence D 1070 includes a table with a first column 1072*a* denoting the operation performed, a second column 1072*b* denoting the reference count value before applying an operation of a particular row, and a third column 1072*c* denoting the reference count value after applying the operation of the particular row. For example, the row 1074*a* indicates that the first inc ref+1 operation is performed after the second thread acquires and holds the non-exclusive lock for the VLB page 1360, where the reference count 1005=1 before the inc ref operation is performed, and where the reference count 1005=2 after the first inc ref operation is performed. Additionally, the second thread while holding the non-exclusive lock for the VLB page 1360 can then perform the second inc ref+1 operation denoted by the row 1074*b*, where the reference count 1005=2 before the second inc ref operation is performed, and where the reference count 1005=3 after the second inc ref operation is performed.

Following completion of the two inc refs represented by the rows 1074*a*-*b*, the two dec refs represented by the rows 1074*c*-*d* can be performed after the first thread acquires and holds the non-exclusive lock for the VLB page 1360. As denoted by the row 1074*c*, the reference count 1005=3 before the first dec ref −1 operation is performed, and where the reference count 1005=2 after the first dec ref operation is performed. Additionally, the first thread while holding the non-exclusive lock for the VLB page 1360 can then perform the second dec ref operation denoted by the row 1074*d*, where the reference count 1005=2 before the second decref operation, and where the reference count 1005=1 after the second dec ref operation is performed.

In connection with the operation sequence D 1070, each of the first and second threads can perform processing as discussed above in connection with the operation sequence A to apply their respective updates to the reference count 1003 of the cached MD page 1002 in order to keep the cached copy 1002 up to date with the stored MD page 1001.

Thus, as illustrated in the example 1050, the reference count 1005 of the cached MD page 1002 can have a valid value which is greater than 0 as denoted by 1070*a*-*d*. In such a case where the reference count value >0 is read from the ref counter 1302*a* of the VLB 1360 of FIG. 6, the associated data block 1364 as well as the pointer 1302*b* to the associated data block 1364 can be valid.

In at least one embodiment in accordance with the techniques of the present disclosure as discussed above, operations to increment and decrement the reference count can be executed using a non-exclusive lock of the MD page including the reference count. Updates to the cached copy of the MD page as stored in a node's local cache of volatile memory can additionally use a node-local spinlock to serialize updates to the cached copy of the MD page. Under a non-exclusive lock, there is no strict sequence or order in which operations or updates to the reference count of the MD page are guaranteed to be performed. However, independent of the order in which a set of increments and/or decrements are applied to the reference count of a MD page, the intermediate transient valid values can vary but the initial or starting reference count value and the ending reference count value can be the same. For example, with reference to FIG. 7B, both the sequences A 1010 and B 1020 have a starting reference count of 1 and an ending reference count of 1 (e.g., 1010*a*, 1020*a*); and with reference to FIG. 7C, both the sequences C 1060 and 107 have a starting reference count of 1 and an ending reference count of 1 (e.g., 1060*d*, 1070*d*).

As noted above, the reference count updates performed using a non-exclusive lock of the MD page, such as the VLB page 1360, guarantees the final resulting value but does not guarantee performing the updates in any single defined sequence and thus, does not guarantee predictable intermediate or transient values for the reference count that may be read from the VLB page 1360 by one thread holding the non-exclusive lock for the page 1360 while another thread (concurrently holding the non-exclusive lock for the page 1360) updates the reference count of the VLB page 1360. Thus, the reference count updates performed using a non-exclusive lock of the MD page, such as the VLB page 1360, guarantees the final resulting value but does not guarantee performing the updates in any single defined sequence and thus, does not guarantee predictable intermediate or transient values for the reference count that may be read from the VLB page 1360 by one thread holding the non-exclusive lock for the page 1360 while another thread (holding the non-exclusive lock for the page 1360) updates the reference count of the VLB page 1360. As a result of race conditions in connection with applying a sequence of updates to the reference count of a MD page, a valid reference count value which is less than 1 is possible, where the associated data block (e.g., 1364), and pointer or reference (e.g., pointer 1302*b*) to the data block (e.g., 1364) can also be valid. In such cases, a reference count that is less than one can be valid and incremented, and where the pointer or reference (e.g., 1302*b*) to the associated data block (e.g., 1364) is also valid and can be used to make additional references for additional logical addresses storing the associated data block which has been detected as a duplicate by deduplication processing.

In at least one embodiment, although incrementing and decrementing a reference count that is less than 1 is possible and can be considered valid in accordance with the techniques of the present disclosure, the probability of such an occurrence can be quite low since it results from a particular sequence of a race condition where the order of updates has been reverted, for example, with respect to the order or sequence in which associated write operations may be received and processed by the data storage system, or node thereof.

In at least one embodiment, when the reference count is decremented to zero, or more generally decremented to a value that is less than one, the pointer or reference, such as 1302*b* of the VLB 1360, to the associated data block, such as the data block 1364, should not be invalidated so as to preserve the ability of reading the data block 1364 using the pointer or reference 1302*b* even when the reference count is less than one.

In at least one embodiment, space or storage accounting regarding free and used storage can be performed regarding BE PD storage. For example, a count of free blocks of storage and a count of used blocks of storage can be maintained and provided to the user of the storage system. In at least one embodiment with reference to FIG. 6, when the reference count, such as 1302*a*, of a VLB, such as the VLB 1360, reaches zero (e.g., dec ref operation decreases the resulting reference count to zero such as illustrated by the dec ref operation 1024*a* of FIG. 7B), the count of the number of free blocks can be incremented by one and the count of the number of used or blocks can be decremented by one. In a similar manner, when the reference count reaches one (e.g., inc ref operation increases the reference count from zero to one as denoted by the inc ref operation 1024*b* of FIG. 7B), the count of the number of free blocks can be decremented by one, and the count of the number of user blocks can be incremented by one.

In at least one system without using the techniques of the present disclosure, a reference count that is zero, or more generally less than one, can denote a bug, error condition or inconsistency since in such conventional systems, when a reference count is zero, it is assumed there are no valid references to the data block associated with the reference count and the storage for the data block can be freed and reclaimed for reuse, and the VLB entry with a pointer or reference to the data block can be reinitialized.

In an embodiment using the techniques of the present disclosure, the reference count can validly assume transient or intermediate values of zero, or more generally less than one. In this case using the techniques of the present disclosure allowing updates to the reference count using a non-exclusive lock, a reference count less than one can be considered valid, for example, in connection with performing an update of the reference count, such as an inc ref operation of the reference count or a dec ref operation of the reference count. As another example, a reference count of less than one can be considered value, for example, when performing a read I/O operation requesting to read current content stored at a logical address. When reading and traversing the mapping information (e.g., as in FIGS. 3, 4, 5 and 6) including the VLB structure to map the logical address to the data block storing the current content of the logical address, a valid reference count less than one can be encountered which is associated with a valid data block. For example with reference to FIG. 6, the reference count 1302*a* can be zero when servicing a read I/O operation to read data from a logical address mapped by mapping information of a MD structure (including the MD leaf 1354 and VLB 1360) to the data block 1364. In this case, the data block 1364 can include valid data stored at the logical address even though the reference count 1302*a* can be zero, or more generally, less than one. Additionally, processing can be performed in connection with deduplication so that the data block 1364 having a reference count less than one can be further mapped to logical addresses as content stored at the logical addresses, where the reference count can be accordingly incremented or updated responsive to being mapped to each such logical address. The data block with an associated reference count less than one can be utilized since the data block and associated VLB entry can be valid, for example, until the data block is reclaimed for reuse, such as by garbage collection. Thus, until the data block is reclaimed for reuse, it can store valid data mapped to a VLB entry that can be further associated with and referenced by a logical address. However, by considering reference count values which are less than one as valid, processing cannot distinguish between valid reference count values associated with a race condition scenario and an actual bug or inconsistency with the reference count. In other words, although a reference count value of less than one can validly occur (e.g., in connection with the particular sequence or order in which inc ref and dec ref operations are performed such as in connection with FIGS. 7B and 7C), it may also be the case that a reference count value of less than one can occur due to a bug, error condition, or inconsistency associated with the reference count.

In at least one embodiment, additional processing can optionally be performed to distinguish valid race condition scenarios, where the reference count can be less than one, from a bug or error condition causing a reference count inconsistency where the reference count can be less than one. In this case, processing can upgrade the non-exclusive lock on the target page to an exclusive lock on the target page if processing encounters a reference count that is zero, or more generally, less than one. For example, assume an inc ref operation is performed to increment a reference count which is initially read and has a value of zero. In this case, rather than performing the inc ref operation when holding the non-exclusive lock on the target VLB page including the reference count, the inc ref operation can be performed when holding the exclusive lock on the target VLB page.

In at least one embodiment, when a thread is attempting to acquire an exclusive lock on a target page, the thread can block or wait in a queue to acquire the exclusive lock if the target page is not currently available for exclusive use or access by the thread. For example, thread A may attempt to acquire the exclusive lock on the target page. However, thread B may currently hold a non-exclusive or exclusive lock on the target page. In this case, thread A can wait or block until the thread B releases its non-exclusive or exclusive lock on the target page thereby resulting in the target page being available for exclusive use by the thread A. Once thread B releases its lock on the target page, the thread A can acquire the exclusive lock on the target page. In a similar manner, when a thread is generally attempting to acquire a specified lock or access on a target page, that thread can block or wait in a FIFO (first in first out) queue of threads waiting to acquire a specified lock or access on the target page. For example, the blocked or waiting thread T1 that wants to acquire an exclusive lock on the target page can wait until all other executing threads release their locks on the target page. Additionally, if there are other threads in the FIFO queue before the blocked thread, the blocked thread T1 can remain blocked and continue to wait until any other thread in the FIFO queue before the blocked thread T1 has also acquired and released its lock on the target page to thereby allow the thread T1 to acquire the exclusive lock on the target page. As another example, assume thread C currently holds an exclusive lock on the target page and threads D and E both attempt to acquire a non-exclusive access to the target page while thread C holds the exclusive lock for the target page. In this case, the threads D and E can block and wait in the FIFO queue associated with the target page. Responsive to thread C releasing its exclusive lock on the target page the threads D and E can both acquire and concurrently hold non-exclusive locks on the target page.

Figure 8:
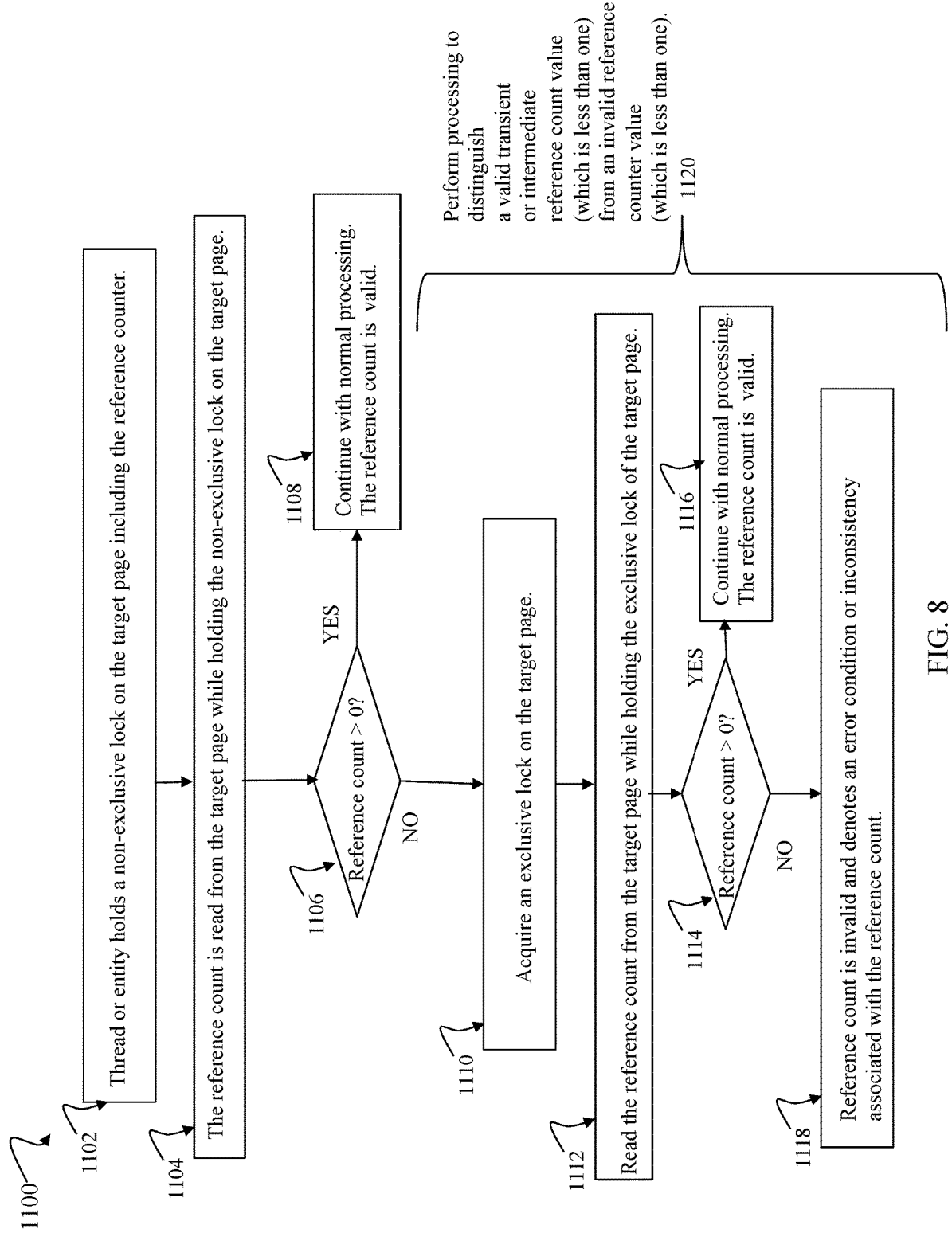

In at least one embodiment, the additional processing noted above which can optionally be performed to distinguish valid race condition scenarios from a bug or error condition causing a reference count inconsistency will now be further described. In this case, processing can upgrade the non-exclusive lock on the target page to an exclusive lock on the target page if processing encounters a reference count that is zero, or more generally, less than one. For example, with reference to the flowchart 1100 of FIG. 8, assume processing is performed in the step 1102 in connection with an inc ref operation, a dec ref operation, or a read I/O operation where a thread or other entity holds a non-exclusive lock on a target page including the desired reference count. From the step 1102, control proceeds to the step 1104.

At the step 1104, the reference count can be read from the target page by the thread or other entity holding a non-exclusive lock on the target page. From the step 1104, control proceeds to the step 1106.

At the step 1106, a determination is made as to whether the reference count read has a current value that greater than zero. If the step 1106 evaluates to yes, control proceeds to the step 1108 where normal processing can continue and the reference count is determined to be valid. If the step 1106 evaluates to no, the processing 1120 can be performed to distinguish a valid transient or intermediate reference count value (which is less than one) from an invalid reference count value (which is less than one). Responsive to the step 1106 evaluating to no, control proceeds to the step 1110.

At the step 1110, processing can then be performed by the thread to acquire the exclusive lock on the target page. As noted above, if the target page is currently accessed by other threads such as other threads holding non-exclusive locks on the target page, the thread or other entity attempting to acquire the exclusive lock on the target page can block and wait until all prior threads complete associated processing and release their non-exclusive locks. In this manner, the processing of the other threads can be allowed to complete and drain prior to the thread acquiring the exclusive lock to the target page. The processing of the other threads completing allows any transient or intermediate value of the reference count of the target page updated by the other threads to complete to its final value. For example, with reference to FIG. 7C, assume the thread T1 reads a reference count value of 0 or −1 as associated with 1064b or 1064c. In this case, the first thread and the second thread as described in connection with the example of FIG. 7C can hold non-exclusive locks on the target page when the thread T1 attempts to acquire the exclusive lock on the target page. Thus the thread T1 blocks or waits until the first and second threads complete their processing of operations as described in connection with the operation sequence 1060 and the first and second threads release their non-exclusive locks on the target page. At the end of the operation sequence C 1060, the final value of the reference count is 1 as denoted by 1060d. Subsequently, the thread T1 is unblocked and can acquire and hold the exclusive lock of the target page while reading the current value of the reference count which is now one (1060d). Thus, from the step 1110, control proceeds to the step 1112 where the reference count is read from the target page while holding the exclusive lock on the target page. From the step 1112, control proceeds to the step 1114.

Figure 7C:
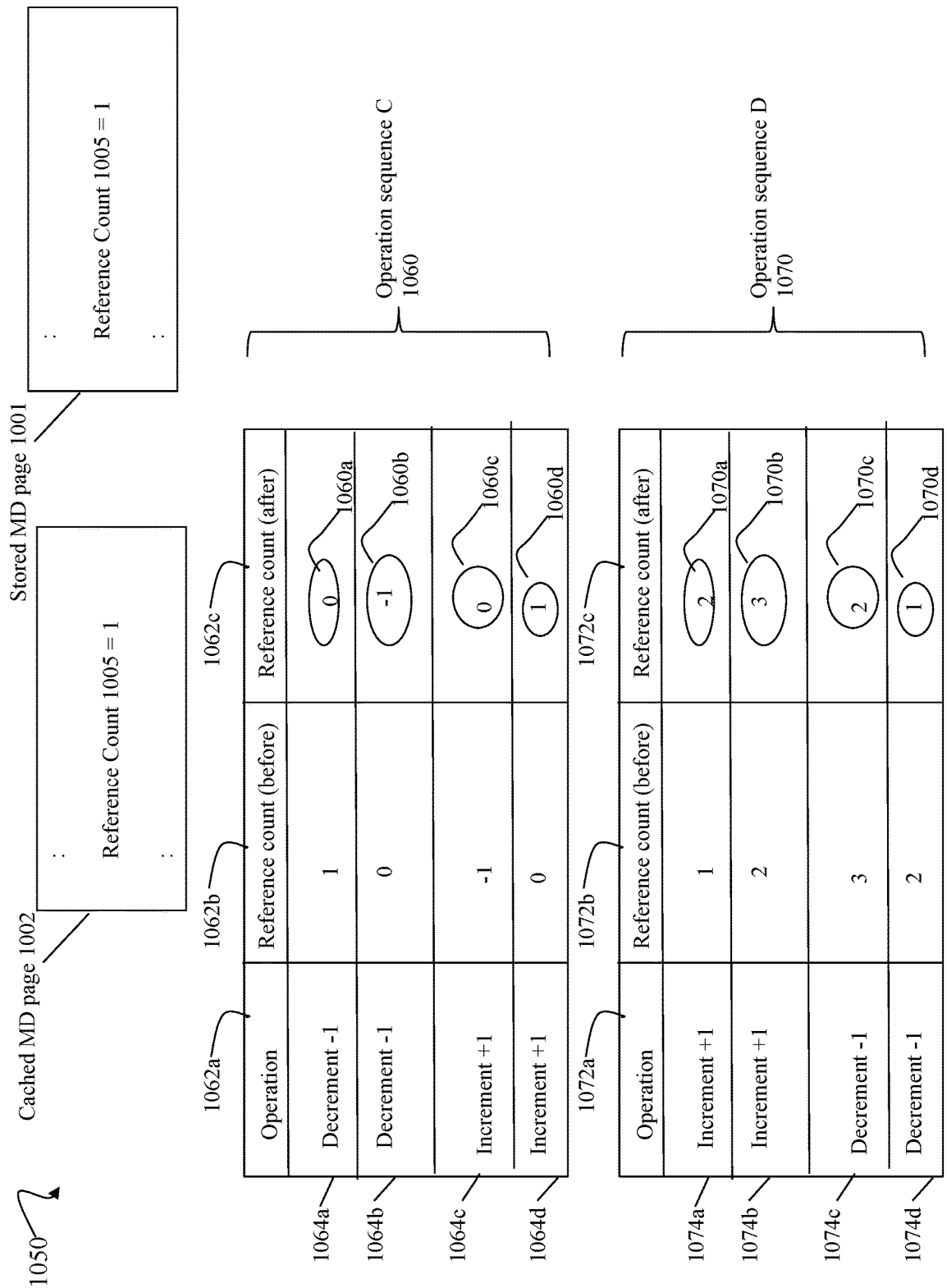
Figure 9:
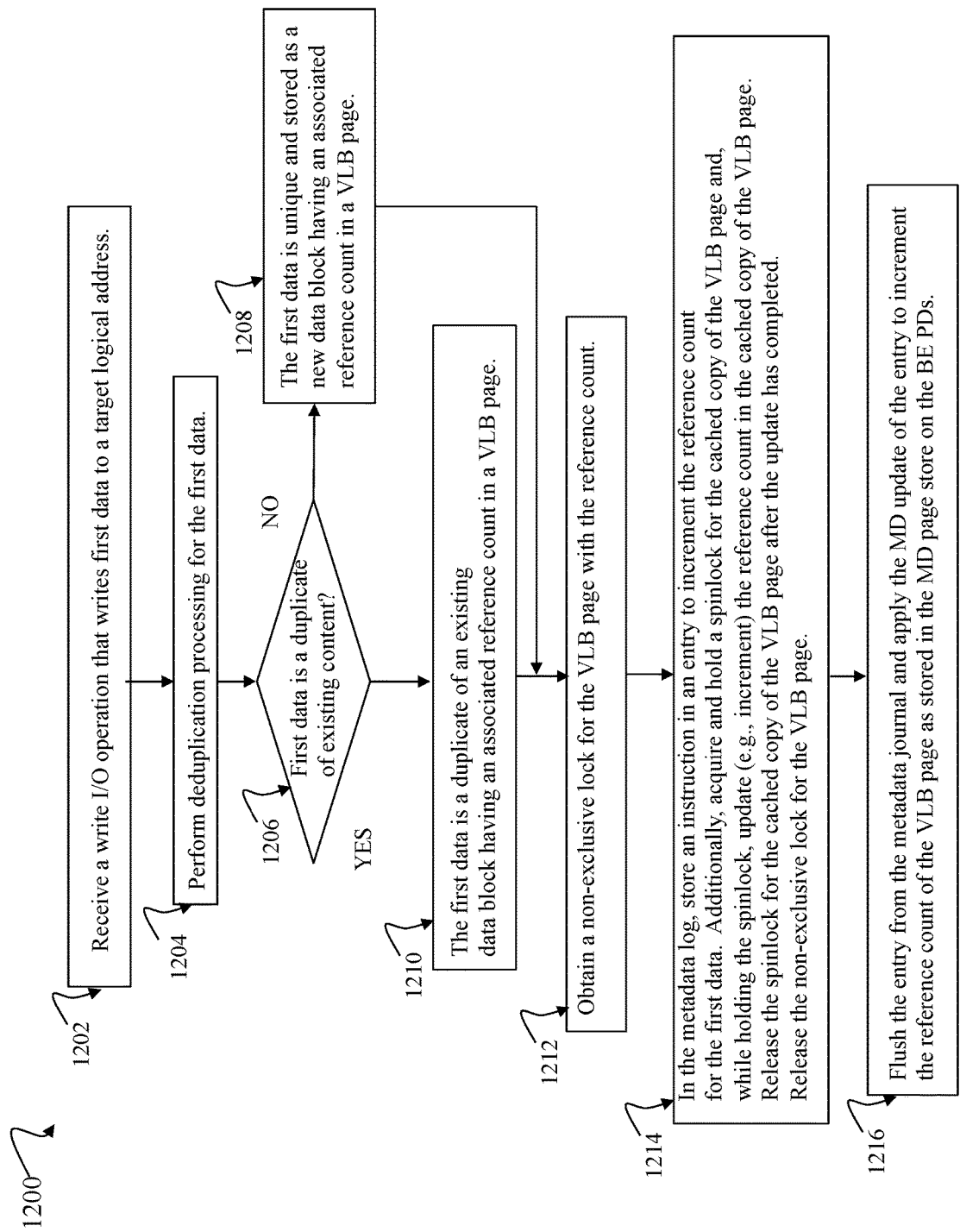

At the step 1114, a determination is made as to whether the reference count read in the step 1112 is greater than zero. If the step 114 evaluates to yes and the current value of the reference count is greater than zero, control proceeds to the step 1116 where the thread T1 can conclude that there is no error condition, bug or inconsistency associated with the reference count and the thread T1 can continue with normal processing. Otherwise, if the step 114 evaluates to no, where the current value of the reference count read while holding the exclusive lock on the target page is not greater than zero, control proceeds to the step 1118 where the thread T1 can conclude that the reference count is invalid and denotes an error condition, bug or inconsistency associated with the reference count. Thus, although intermediate or transitory values of the reference count associated with a valid sequence of operations can be zero or more generally less than one, the initial and final values can be expected to be greater than zero to be valid. For example, the operation sequences A 1010 and B 1020 of FIG. 7B are valid since each of the sequences 1010 and 1020 have an initial or starting reference count of 1 (e.g., more generally greater than 0) and final reference counts of 1 (1010*a* and 1020*a*), or more generally greater than 0. The operation sequences C 1060 and D 1070 of FIG. 7C are valid since each of the sequences 1060 and 1070 have an initial or starting reference count of 1 (e.g., more generally greater than 0) and final reference counts of 1 (1060*d*, 1070*d*), or more generally greater than Referring to FIG. 9, shown is a flowchart 1200 of processing steps that can be performed in an at least one embodiment in accordance with the techniques of the present disclosure. The flowchart 1200 summarizes processing that can be performed in connection with processing a write I/O operation.

At the step 1202, a write I/O operation can be received that writes first data to a target logical address. From the step 1202, control proceeds to the step 1204 where deduplication processing can be performed for the first data. From the step 1204, control proceeds to the step 1206.

At the step 1206, a determination is made as to whether the first data is a duplicate of existing content, such as, for example, of an existing data block stored on the BE PDs. If the step 1206 evaluates to no, control proceeds to the step 1208. At the step 1208, processing determines that the first data is unique and stored as a new data block having an associated reference count in a VLB page. From the step 1208, control proceeds to the step 1212. If the step 1206 evaluates to yes, control proceeds to the step 1210. At the step 1210, the first data is determined to be a duplicate of an existing data block have an associated reference count in a VLB page. From the step 1210, control proceeds to the step 1212.

At the step 1212, processing is performed to obtain a non-exclusive lock for the VLB page with the reference count. The VLB page of the step 1212 is either the VLB page described in connection with the step 1208, or otherwise the VLB page described in connection with the step 1210. From the step 1212, control proceeds to the step 1214.

At the step 1214, in the metadata log, processing stores an instruction an entry to increment the reference count for the first data. Additionally, processing of the step 1214 can include acquiring and holding a spinlock for the cached copy of the VLB page and, while holding the spinlock, updating the reference count in the cached copy of the VLB page. Processing of the step 1214 can include releasing the spinlock for the cached copy of the VLB page after the update of the cached copy of the VLB page has completed. After the updates are recorded in the metadata log and made to the cached copy of the VLB page, the non-exclusive lock for the VLB page can be released. From the step 1214, control proceeds to the step 1216.

At the step 1216, the entry can be flushed from the metadata journal to apply the MD update of the entry to increment the reference count of the VLB page as stored in the MD page store on the BE PDs.

Referring to FIG. 10, shown is a flowchart 1250 of processing steps that can be performed in an at least one embodiment in accordance with the techniques of the present disclosure. The flowchart 1250 describes processing that can be performed in connection with servicing a write I/O operation that overwrites existing content stored at a target logical address with new updated content. In connection with such an overwrite, processing as described in connection with the flowchart 1250 can include incrementing a reference count associated with the new updated content and decrementing a reference count associated with the old or existing content which is overwritten.

At the step 1252, a write I/O operation can be received that writes second data to a target logical address. First data can be stored at the target logical address which is overwritten by the write I/O operation with the second data, which is different than the first data. From the step 1252, control proceeds to the step 1254.

At the step 1254, processing can determine a first VLB page including a first reference count for the first data. From the step 1254, control proceeds to the step 1256.

At the step 1256, processing can obtain a first non-exclusive lock for the first VLB page with the first reference count for the first data. From the step 1256, control proceeds to the step 1258.

At the step 1258, processing can store an instruction in a first entry of the metadata log to decrement the first reference count for the first data. Additionally, processing of the step 1258 can acquire and hold a first spinlock for the cached copy of the first VLB page and, while holding the first spinlock, update the first reference count in the cached copy of the first VLB page. The first spinlock for the cached copy of the first VLB page can be released after the update to the cached copy of the first VLB page has completed. Additionally, the first non-exclusive lock for the first VLB page can be released after the update is performed to the cached copy of the first VLB page and after the first entry has been stored in the metadata log. From the step 1258, control proceeds to the step 1260.

At the step 1260, processing can determine a second VLB page include a second reference count for the second data. From the step 1260, control proceeds to the step 1262.

At the step 1262, processing can obtain a second non-exclusive lock for the second VLB page with the second reference count for the second data. From the step 1262, control proceeds to the step 1264.

At the step 1264, processing can store an instruction in a second entry of the metadata log to increment the second reference count for the second data. Additionally, processing of the step 1264 can acquire and hold a second spinlock for the cached copy of the second VLB page and, while holding the second spinlock, update the second reference count in the cached copy of the second VLB page. The second spinlock for the cached copy of the second VLB page can be released after the update to the cached copy of the second VLB page has completed. Additionally, the second non-exclusive lock for the second VLB page can be released after the update is performed to the cached copy of the second VLB page and after the second entry has been stored in the metadata log. From the step 1264, control proceeds to the step 1266.

At the step 1266, processing can flush the first and second entries from the metadata log and apply the represented MD updates to the associated VLB pages identified by the entries. The VLB pages can be stored in the MD page store on the BE PDs.

It should be noted that in some embodiments, updating a cached copy of a MD page, such as described above in connection with FIGS. 9 and 10, can be optionally performed with each update to the MD page as recorded in the metadata log and subsequently applied to the persistently stored MD page of the BE PDs (e.g., MD page store). As a variation to updating the cached copy of the MD page each time there is an update to the MD page recorded in the metadata log, an embodiment can invalidate the cached copy of the MD page, or just in validate the reference count of the cached copy of the MD page, responsive to recording an update to the reference count of the MD page in the metadata log. The invalid reference count of the cached MD page can be identified, for example, using a flag or other indicator associated with cached reference count denoting whether the cached reference count is valid or invalid. In such an embodiment, the cached value of the reference count may be usable even though it may not the current up to date value of the reference count.

In such an embodiment, a current, accurate up to date value for the reference count of the MD page can be obtained on demand such as generally in response to an event using the up to date reference count. An up to date reference count can be determined, for example, by acquiring and holding the exclusive lock on the MD page, reading the reference count of the persistently stored MD page of the BE PDs (e.g., MD page store), and then releasing the exclusive lock on the MD page.

Described above are examples of use cases as to when a reference count can be used and when the reference count can be incremented and/or decremented in accordance with the techniques of the present disclosure. More generally, the techniques of the present disclosure can be used in connection with any suitable data item and when performing any suitable operation. For example, a reference count of a VLB page can be decremented in connection with other operations besides the particular overwrite example of FIG. 10. The reference count of a VLB page associated with a stored data block can generally be decremented in connection with other use cases, such as, for example, as part of an operation to delete a storage entity such as a logical device, file, file system, directory, and the like, where the content of the stored data block is stored in the storage entity which is deleted in a system that performs data deduplication.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

The invention claimed is:

1. A computer-implemented method comprising:
receiving a request to perform a first operation in a system that stores deduplicated data, wherein the system includes a first data block stored at a plurality of logical addresses each referencing the first data block, wherein a reference count is associated with the first data block and denotes a number of logical addresses referencing the first data block; and
performing first processing to service the request and perform the first operation, the first processing including:
acquiring a non-exclusive lock for a page that includes the reference count of the first data block;
storing, in a metadata log while holding the non-exclusive lock on the page, an entry to decrement the reference count of the first data block; and
releasing the non-exclusive lock on the page.

2. The computer-implemented method of claim 1, wherein the first operation includes deleting content stored at a first logical address, and wherein the first data block is stored at the first logical address and a second of the plurality of logical addresses.

3. The computer-implemented method of claim 2, wherein the first operation is a command to delete a storage object including the first logical address.

4. The computer-implemented method of claim 3, wherein the storage object is any of a logical device, a file, a file system, and a directory.

5. The computer-implemented method of claim 1, wherein the first operation is a write operation that writes second data to a first of the plurality of logical addresses, wherein the first logical address references the first data block prior to the write operation and indicates that prior to the write operation first data stored in the first data block is stored at the first logical address, wherein the write operation overwrites the first logical address with second data stored in a second data block, and wherein a second page includes a second reference count denoting a number of logical addresses that reference the second data block storing the second data.

6. The computer-implemented method of claim 5, wherein said first processing includes:
determining that the second data stored at the first logical address by the write operation is a duplicate of an existing copy of the second data stored at the second data block, wherein a second of the plurality of logical addresses references the second data block prior to performing the first processing to service the write operation;
acquiring a second non-exclusive lock for the second page that includes the second reference count of the second data block;
storing, in the metadata log while holding the second non-exclusive lock on the second page, an entry to increment the second reference count of the second data block; and
releasing the second non-exclusive lock on the second page.

7. The computer-implemented method of claim 1, wherein the first processing includes:
acquiring a spinlock for a cached copy of the page stored in a cache;
while holding the spinlock and the non-exclusive lock on the page, updating a copy of the reference count included in the cached copy of the page, wherein said updating includes decrementing the copy of the reference count in the cached copy of the page; and
releasing the spinlock.

8. The computer-implemented method of claim 7, wherein the system includes a plurality of nodes, the cache is a local cache of a first node of the plurality of nodes, and wherein the cache is accessible and used by only the first node and not by any other node of the plurality of nodes.

9. The computer-implemented method of claim 8, wherein the non-exclusive lock of the page is a global lock having associated state that is synchronized across the plurality of nodes using internode communication, wherein access allowable using the non-exclusive lock on the page includes reading and writing of the page as persistently stored on backend storage of the system and also includes reading and writing of a cached copy of the page.

10. The computer-implemented method of claim 9, wherein a first thread of the first node and a second thread of the first node concurrently hold the non-exclusive lock on the page, and wherein the first thread and the second thread concurrently update the page by recording entries in the metadata journal to update the page.

11. The computer-implemented method of claim 8, wherein the first processing is performed by an executing code entity that executes on the first node, wherein the spinlock is a node-local lock of the first node and provides exclusive access of the cached copy of the page to the executing code entity of the first node when the spinlock is held by the executing code entity.

12. The computer-implemented method of claim 1, further comprising:
    receiving, from a storage client, a read operation that reads first data from a first logical address of the plurality of logical address, wherein the first logical address references the first data block storing the first data, wherein mapping information maps the first logical address to the first data block, wherein the mapping information includes the page comprising the reference count and a field that references the first data block;
    retrieving, using the mapping information, current content stored at the first logical address, wherein the current content includes the first data from the first data block, and wherein said retrieving uses the mapping information to read the first data from the first data block, wherein the reference count of the page is less than one when said retrieving is performed; and
    responsive to the read operation, returning the first data to the storage client.

13. The computer-implemented method of claim 12, further comprising:
    reading the reference count of the page while holding the non-exclusive lock of the page;
    responsive to said reading, determining that the reference count is less than one; and
    responsive to determining the reference count is less than one, performing second processing including:
       acquiring and holding an exclusive lock on the page;
       rereading the reference count of the page while holding the exclusive lock of the page;
       responsive to said rereading, determining whether the reference count of the page is greater than zero;
       responsive to determining the reference count is greater than zero, determining that the reference count is valid; and
       responsive to determining that the reference count is not greater than zero, determining that the reference count is invalid and denotes an error condition.

14. The computer-implemented method of claim 13, wherein the exclusive lock of the page is a global lock having associated state that is synchronized across a plurality of nodes using internode communication, wherein an executing code entity of a first of the plurality of nodes holds the exclusive lock on the page and is granted exclusive access to the page as stored persistently on backend storage of the system, and is granted exclusive access to the page as cached on the first node.

15. A system comprising:
    one or more processors; and
    one or more memories comprising code stored thereon that, when executed, performs a method of comprising:
       receiving a request to perform a first operation in a system that stores deduplicated data, wherein the system includes a first data block stored at a plurality of logical addresses each referencing the first data block, wherein a reference count is associated with the first data block and denotes a number of logical addresses referencing the first data block; and
       performing first processing to service the request and perform the first operation, the first processing including:
          acquiring a non-exclusive lock for a page that includes the reference count of the first data block;
          storing, in a metadata log while holding the non-exclusive lock on the page, an entry to decrement the reference count of the first data block; and
          releasing the non-exclusive lock on the page.

16. A non-transitory computer readable medium comprising code stored thereon that, when executed, performs a method comprising:
    receiving a request to perform a first operation in a system that stores deduplicated data, wherein the system includes a first data block stored at a plurality of logical addresses each referencing the first data block, wherein a reference count is associated with the first data block and denotes a number of logical addresses referencing the first data block; and
    performing first processing to service the request and perform the first operation, the first processing including:
       acquiring a non-exclusive lock for a page that includes the reference count of the first data block;
       storing, in a metadata log while holding the non-exclusive lock on the page, an entry to decrement the reference count of the first data block; and
       releasing the non-exclusive lock on the page.

17. The non-transitory computer readable medium of claim 16, wherein the first operation includes deleting content stored at a first logical address, and wherein the first data block is stored at the first logical address and a second of the plurality of logical addresses.

18. The non-transitory computer readable medium of claim 17, wherein the first operation is a command to delete a storage object including the first logical address.

19. The non-transitory computer readable medium of claim 18, wherein the storage object is any of a logical device, a file, a file system, and a directory.

20. The non-transitory computer readable medium of claim 16, wherein the first operation is a write operation that writes second data to a first of the plurality of logical addresses, wherein the first logical address references the first data block prior to the write operation and indicates that prior to the write operation first data stored in the first data block is stored at the first logical address, wherein the write operation overwrites the first logical address with second data stored in a second data block, and wherein a second page includes a second reference count denoting a number of logical addresses that reference the second data block storing the second data.

* * * * *